United States Patent
Kaufman

(10) Patent No.: US 10,516,972 B1
(45) Date of Patent: Dec. 24, 2019

(54) EMPLOYING AN ALTERNATE IDENTIFIER FOR SUBSCRIPTION ACCESS TO MOBILE LOCATION INFORMATION

(71) Applicant: AT&T Intellectual Property I, L.P., Atlanta, GA (US)

(72) Inventor: David Kaufman, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/996,203

(22) Filed: Jun. 1, 2018

(51) Int. Cl.
| | | |
|---|---|---|
| H04W 64/00 | (2009.01) | |
| H04W 4/02 | (2018.01) | |
| H04W 8/26 | (2009.01) | |
| H04W 48/18 | (2009.01) | |
| H04W 4/029 | (2018.01) | |
| G08G 1/00 | (2006.01) | |
| H04W 12/08 | (2009.01) | |

(52) U.S. Cl.
CPC ............ *H04W 4/029* (2018.02); *G08G 1/205* (2013.01); *H04W 12/08* (2013.01)

(58) Field of Classification Search
CPC ......... H04W 4/02; H04W 48/18; H04W 8/26; H04W 64/00; H04W 4/029
USPC ...................... 455/404.2, 432.1, 456.1, 414.1
See application file for complete search history.

(56) References Cited

U.S. PATENT DOCUMENTS

| | | |
|---|---|---|
| 4,718,081 A | 1/1988 | Brenig |
| 5,515,062 A | 5/1996 | Maine et al. |
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |

(Continued)

FOREIGN PATENT DOCUMENTS

| | | |
|---|---|---|
| EP | 0 856 746 A2 | 8/1998 |
| EP | 1 145 526 A2 | 10/2001 |

(Continued)

OTHER PUBLICATIONS

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

(Continued)

*Primary Examiner* — William D Cumming
(74) *Attorney, Agent, or Firm* — Amin, Turocy & Watson, LLP

(57) ABSTRACT

Access to location information related to mobile devices is disclosed. A component can receive a subscription request comprising an alternate identity corresponding to a primary identity and related to returning location related data associated with a set of network event locating system (NELOS) information. NELOS information can be received from a NELOS component and can be derived from timed fingerprint location (TFL) information associated with a user equipment (UE). TFL information and NELOS information can be distinct from location information determined from conventional techniques that can provide for additional benefit. The subscription request can indicate continuing access to location information without subsequent requests. Moreover, access can be via a push of information to a subscribing device.

20 Claims, 10 Drawing Sheets

(56) References Cited

U.S. PATENT DOCUMENTS

| | | | |
|---|---|---|---|
| 5,844,521 | A | 12/1998 | Stephens et al. |
| 5,982,324 | A | 11/1999 | Watters et al. |
| 6,018,312 | A | 1/2000 | Haworth |
| 6,026,301 | A | 2/2000 | Satarasinghe |
| 6,058,260 | A | 5/2000 | Brockel et al. |
| 6,108,532 | A | 8/2000 | Matsuda et al. |
| 6,108,556 | A | 8/2000 | Ito |
| 6,125,125 | A | 9/2000 | Narasimha et al. |
| 6,148,219 | A | 11/2000 | Engelbrecht et al. |
| 6,216,002 | B1 | 4/2001 | Holmring |
| 6,230,018 | B1 | 5/2001 | Watters et al. |
| 6,256,577 | B1 | 7/2001 | Graunke |
| 6,263,190 | B1 | 7/2001 | Mamori et al. |
| 6,292,665 | B1 | 9/2001 | Hildebrand et al. |
| 6,298,233 | B1 | 10/2001 | Souissi et al. |
| 6,307,503 | B1 | 10/2001 | Liu |
| 6,311,078 | B1 | 10/2001 | Hardouin |
| 6,317,686 | B1 | 11/2001 | Ran |
| 6,321,092 | B1 | 11/2001 | Fitch et al. |
| 6,330,459 | B1 | 12/2001 | Crichton et al. |
| 6,351,235 | B1 | 2/2002 | Stilp |
| 6,353,778 | B1 | 3/2002 | Brown |
| 6,397,074 | B1 | 5/2002 | Pihl et al. |
| 6,405,047 | B1 | 6/2002 | Moon |
| 6,407,703 | B1 | 6/2002 | Minter et al. |
| 6,429,815 | B1 | 8/2002 | Soliman |
| 6,434,396 | B1 | 8/2002 | Rune |
| 6,449,486 | B1 | 9/2002 | Rao |
| 6,453,168 | B1 | 9/2002 | McCrady et al. |
| 6,493,539 | B1 | 12/2002 | Falco et al. |
| 6,515,623 | B2 | 2/2003 | Johnson |
| 6,522,296 | B2 | 2/2003 | Holt |
| 6,526,335 | B1 | 2/2003 | Treyz et al. |
| 6,552,682 | B1 | 4/2003 | Fan |
| 6,560,532 | B2 | 5/2003 | Cayford |
| 6,560,567 | B1 | 5/2003 | Yechuri |
| 6,594,576 | B2 | 7/2003 | Fan et al. |
| 6,604,083 | B1 | 8/2003 | Bailey |
| 6,668,226 | B2 | 12/2003 | Sutanto |
| 6,690,292 | B1 | 2/2004 | Meadows et al. |
| 6,744,383 | B1 | 6/2004 | Alfred et al. |
| 6,744,740 | B2 | 6/2004 | Chen |
| 6,757,545 | B2 | 6/2004 | Nowak et al. |
| 6,801,782 | B2 | 10/2004 | McCrady et al. |
| 6,801,855 | B1 | 10/2004 | Walters et al. |
| 6,816,782 | B1 | 11/2004 | Walters et al. |
| 6,850,761 | B2 | 2/2005 | Pallonen |
| 6,892,054 | B2 | 5/2005 | Belcher et al. |
| 6,915,123 | B1 | 7/2005 | Daudelin et al. |
| 6,933,100 | B2 | 8/2005 | Igawa et al. |
| 6,933,860 | B1 | 8/2005 | Gehman |
| 7,058,710 | B2 | 6/2006 | McCall et al. |
| 7,065,349 | B2 | 6/2006 | Nath et al. |
| 7,098,805 | B2 | 8/2006 | Meadows et al. |
| 7,113,793 | B2 | 9/2006 | Veerasamy et al. |
| 7,149,534 | B2 | 12/2006 | Bloebaum et al. |
| 7,181,218 | B2 | 2/2007 | Ovesjo et al. |
| 7,203,752 | B2 | 4/2007 | Rice et al. |
| 7,277,049 | B2 | 10/2007 | Komeluk et al. |
| 7,289,039 | B2 | 10/2007 | Kato et al. |
| 7,346,359 | B2 | 3/2008 | Damarla et al. |
| 7,359,719 | B1 | 4/2008 | Duffett-Smith et al. |
| 7,366,492 | B1 | 4/2008 | Ganesh |
| 7,375,649 | B2 | 5/2008 | Gueziec |
| 7,420,464 | B2 | 9/2008 | Fitzgerald et al. |
| 7,432,829 | B2 | 10/2008 | Poltorak |
| 7,436,794 | B2 | 10/2008 | Takahashi et al. |
| 7,463,143 | B2 | 12/2008 | Forr et al. |
| 7,508,321 | B2 | 3/2009 | Gueziec et al. |
| 7,664,492 | B1 | 2/2010 | Lee et al. |
| 7,696,922 | B2 | 4/2010 | Nicholson et al. |
| 7,697,917 | B2 | 4/2010 | Camp, Jr. et al. |
| 7,706,964 | B2 | 4/2010 | Horvitz et al. |
| 7,744,740 | B2 | 6/2010 | Diehl |
| 7,747,258 | B2 | 6/2010 | Farmer |
| 7,761,225 | B2 | 7/2010 | Vaughn |
| 7,831,380 | B2 | 11/2010 | Chapman et al. |
| 7,848,880 | B2 | 12/2010 | Cheung |
| 7,890,299 | B2 | 2/2011 | Fok et al. |
| 7,917,156 | B2 | 3/2011 | Sheynblat |
| 7,945,271 | B1 | 5/2011 | Barnes et al. |
| 7,958,001 | B2 | 6/2011 | Abbadessa et al. |
| 7,962,162 | B2 | 6/2011 | McNair |
| 7,962,280 | B2 | 6/2011 | Kindo et al. |
| 7,994,981 | B1 | 8/2011 | Farrokhi et al. |
| 7,996,020 | B1 | 8/2011 | Chhabra |
| 8,000,726 | B2 | 8/2011 | Altman et al. |
| 8,005,050 | B2 | 8/2011 | Scheinert et al. |
| 8,010,164 | B1 | 8/2011 | Sennett et al. |
| 8,036,822 | B2 | 10/2011 | Ho |
| 8,050,690 | B2 | 11/2011 | Neeraj |
| 8,054,802 | B2 | 11/2011 | Burgess et al. |
| 8,065,185 | B2 | 11/2011 | Foladare et al. |
| 8,098,152 | B2 | 1/2012 | Zhang et al. |
| 8,121,604 | B1 | 2/2012 | Schwinghammer |
| 8,126,479 | B2 | 2/2012 | Morrison |
| 8,140,079 | B2 | 3/2012 | Olson |
| 8,193,984 | B2 | 6/2012 | Ward et al. |
| 8,194,589 | B2 | 6/2012 | Wynn et al. |
| 8,195,175 | B2 | 6/2012 | Govindan et al. |
| 8,224,349 | B2 | 7/2012 | Meredith et al. |
| 8,253,559 | B2 | 8/2012 | Howard et al. |
| 8,254,959 | B2 | 8/2012 | Fix et al. |
| 8,264,956 | B2 | 9/2012 | Ramankutty et al. |
| 8,270,933 | B2 | 9/2012 | Riemer et al. |
| 8,280,438 | B2 | 10/2012 | Barbera |
| 8,295,854 | B2 | 10/2012 | Osann, Jr. |
| 8,300,663 | B2 | 10/2012 | Chion et al. |
| 8,307,030 | B1 | 11/2012 | Hu |
| 8,326,682 | B2 | 12/2012 | Redford et al. |
| 8,355,364 | B1 | 1/2013 | Vargantwar et al. |
| 8,355,865 | B2 | 1/2013 | Wagner et al. |
| 8,402,356 | B2 | 3/2013 | Martinez et al. |
| 8,417,264 | B1 | 4/2013 | Whitney et al. |
| 8,437,790 | B1 | 5/2013 | Hassan et al. |
| 8,464,164 | B2 | 6/2013 | Hon et al. |
| 8,469,274 | B2 | 6/2013 | Tseng et al. |
| 8,548,494 | B2 | 10/2013 | Agarwal et al. |
| 8,572,198 | B2 | 10/2013 | Jhanji |
| 8,594,700 | B2 | 11/2013 | Nabbefeld |
| 8,611,919 | B2 | 12/2013 | Barnes, Jr. |
| 8,612,410 | B2 | 12/2013 | Meredith et al. |
| 8,666,388 | B2 | 3/2014 | Catovic et al. |
| 8,666,390 | B2 | 3/2014 | Meredith et al. |
| 8,761,799 | B2 | 6/2014 | Meredith et al. |
| 8,768,348 | B2 | 7/2014 | Stuempert et al. |
| 8,849,254 | B2 * | 9/2014 | Bolon ............... H04W 4/029 455/414.1 |
| 8,897,805 | B2 | 11/2014 | Fix et al. |
| 8,909,247 | B2 | 12/2014 | Tipton et al. |
| 8,923,134 | B2 | 12/2014 | Meredith et al. |
| 8,929,827 | B2 | 1/2015 | Fix et al. |
| 9,002,373 | B2 | 4/2015 | Marti et al. |
| 9,008,684 | B2 | 4/2015 | Tipton et al. |
| 9,008,698 | B2 | 4/2015 | Meredith et al. |
| 9,053,513 | B2 | 6/2015 | Meredith et al. |
| 9,066,227 | B2 | 6/2015 | Spencer et al. |
| 9,100,891 | B2 | 8/2015 | Zheng et al. |
| 9,137,772 | B2 | 9/2015 | Hazzani et al. |
| 9,196,157 | B2 | 11/2015 | Hardin et al. |
| 9,232,399 | B2 | 1/2016 | Tipton et al. |
| 9,351,111 | B1 * | 5/2016 | Kaufman ............. H04W 4/029 |
| 9,473,904 | B2 | 10/2016 | Bennett |
| 9,510,355 | B2 | 11/2016 | Meredith et al. |
| 9,519,043 | B2 | 12/2016 | Fix et al. |
| 9,537,950 | B2 | 1/2017 | Ibasco et al. |
| 9,564,962 | B2 | 2/2017 | Yarnold et al. |
| 9,596,671 | B2 | 3/2017 | Fix et al. |
| 9,667,660 | B2 | 5/2017 | Tipton et al. |
| 9,723,446 | B2 | 8/2017 | Fix et al. |
| 9,769,615 | B2 | 9/2017 | Fix et al. |
| 9,769,623 | B2 | 9/2017 | Fix et al. |
| 9,807,250 | B2 | 10/2017 | Austin et al. |
| 9,810,765 | B2 | 11/2017 | Fix et al. |

(56) References Cited

U.S. PATENT DOCUMENTS

| | | |
|---|---|---|
| 9,813,900 B2 | 11/2017 | Meredith et al. |
| 9,858,575 B2 | 1/2018 | Meredith et al. |
| 10,084,824 B2 | 9/2018 | Tipton et al. |
| 10,206,056 B2 * | 2/2019 | Kaufman ............ H04W 4/029 |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0069024 A1 | 4/2003 | Kennedy, Jr. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duri et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0043037 A1 * | 2/2005 | Ioppe ............ H04W 4/02 455/456.1 |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0143292 A1 | 6/2006 | Taubenheim et al. |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0276168 A1 * | 12/2006 | Fuller, Jr. ............ H04M 11/04 455/404.2 |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0261611 A1 | 10/2008 | Mia et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1 | 3/2009 | Howarter et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren |
| 2009/0125380 A1 | 5/2009 | Otto et al. |
| 2009/0131073 A1 | 5/2009 | Carlson et al. |
| 2009/0161599 A1 | 6/2009 | Haartsen et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi |
| 2010/0163632 A1 | 7/2010 | Tseng et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0313157 A1 | 10/2010 | Carlsson et al. |
| 2010/0279708 A1 | 11/2010 | Lidsrom et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0028129 A1 | 2/2011 | Hutchison et al. |

(56) References Cited

U.S. PATENT DOCUMENTS

| | | |
|---|---|---|
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly et al. |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0175724 A1 | 7/2011 | Kent |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0069386 A1 | 3/2012 | St. Laurent et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0143758 A1 | 6/2012 | Anantha et al. |
| 2012/0144452 A1 | 6/2012 | Dyor et al. |
| 2012/0144457 A1 | 6/2012 | Counterman |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0192258 A1 | 7/2012 | Spencer et al. |
| 2012/0214509 A1 | 8/2012 | Levin et al. |
| 2012/0221232 A1 | 8/2012 | Shang et al. |
| 2012/0253656 A1 | 10/2012 | Brandt |
| 2012/0276900 A1 | 11/2012 | Stephens et al. |
| 2012/0282924 A1* | 11/2012 | Tagg ............... H04W 48/18 455/432.1 |
| 2012/0286997 A1 | 11/2012 | Lin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1* | 1/2013 | Bolon ............... H04W 4/029 455/414.1 |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0078994 A1 | 3/2013 | Jouin |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0150053 A1 | 6/2013 | Hwang et al. |
| 2013/0226451 A1 | 8/2013 | O'Neill et al. |
| 2013/0267242 A1 | 10/2013 | Curticapean et al. |
| 2013/0267249 A1 | 10/2013 | Rosenberg |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2014/0365488 A1 | 12/2014 | Arslan et al. |
| 2015/0011249 A1 | 1/2015 | Siliski et al. |
| 2015/0098712 A1 | 4/2015 | Li et al. |
| 2015/0147997 A1 | 5/2015 | Shaw et al. |
| 2015/0324718 A1* | 11/2015 | Lord ............... G06Q 50/30 705/7.13 |
| 2016/0321642 A1 | 11/2016 | Kaufman et al. |
| 2017/0280317 A1* | 9/2017 | Tagg ............... H04W 8/26 |
| 2017/0318428 A1 | 11/2017 | Wang et al. |
| 2019/0166574 A1* | 5/2019 | Abou-Rizk ........... H04W 64/00 |

FOREIGN PATENT DOCUMENTS

| | | |
|---|---|---|
| EP | 2999241 | 3/2016 |
| JP | 2004-069609 A | 3/2004 |
| JP | 2005-091303 A | 4/2005 |
| JP | 2007-328050 A | 12/2007 |
| WO | 2006/031035 A1 | 3/2006 |

OTHER PUBLICATIONS

3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

New Devices Aim to Disable Cell Phones While Driving. FOXNews. com, Jan. 18, 2009. http://www.foxnews.com/printer_friendly_story/0,3566,480585,00.html. Last accessed Nov. 24, 2010, 2 pages.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages.

Drucker, et al., "Support Vector Regression Machine", .http://scholar.google.com/scholar?q=%22Support+Vector+Regression+Machines.%22. Last accessed Dec. 24, 2010, 7 pages.

(56) References Cited

OTHER PUBLICATIONS

Suykens et al. "Least squares support vector machine classifiers", Neural Processing Letters, vol. 9, No. 3, Jun. 1999, pp. 293-300.
Ferris et al. (2002). "Interior-point methods for Massive Support Vector Machines". SIAM Journal on Optimization 13: 783-804. doi:10.1137/S1052623400374379.
Meyer et al. "The support vector machine under test." Neurocomputing 55(1-2): 169-186, 2003.
International Search Report and Written Opinion for PCT Application No. PCT/US2011/026122 dated Jun. 10, 2011, 9 pages.
International Search Report and Written Opinion for PCT Application No. PCT/US2011/026120 dated Jun. 9, 2011, 11 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_en US398&q=cache:trsMn9Sin6wJ:http://apb.directionsmag.com/entry/location-labs-powers-location-based-fraud-detection/162802+http%3A//apb.directionsmag.com/entry/location-labs-powers-location-based- ...1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att, 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system. Retrieved on Aug. 15, 2011, 7 pages.
Koukoumidis et al., "SignalGuru: Leveraging Mobile Phones for Collaborative Traffic Signal Schedule Advisory." MobiSys'11, Jun. 28-Jul. 1, 2011, Bethesda, Maryland, USA, Copyright 2011 ACM 978-1-4503-0643-0/11/06. Retrieved on Nov. 19, 2011, 14 pages.
Bitcarrier Technology. Published online at http://www.bitcarrier.com/technology. Retrieved on Aug. 15, 2011, 1 page.
Hao et al., "Estimating Vehicle Position in a Queue at Signalized Intersections Using Simple Travel Times from Mobile Sensors." Retrieved on Nov. 19, 2011, 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Non-Final Office Action dated Dec. 28, 2011 for U.S. Appl. No. 12/836,471, 34 pages.
Non-Final Office Action dated Feb. 23, 2012 for U.S. Appl. No. 12/967,747, 31 pages.
Non-Final Office Action dated Dec. 15, 2011 for U.S. Appl. No. 12/712,424, 34 pages.
Non-Final Office Action dated Apr. 13, 2012 for U.S. Appl. No. 12/416,853, 36 pages.
Non-Final Office Action dated Oct. 2, 2012 for U.S. Appl. No. 13/554,285, 19 pages.
Non-Final Office Action dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Final Office Action dated Jul. 30, 2012 for U.S. Appl. No. 12/967,747, 28 pages.
Non-Final Office Action dated Jul. 17, 2012 for U.S. Appl. No. 13/220,083, 57 pages.
Non-Final Office Action dated Sep. 11, 2012 for U.S. Appl. No. 13/188,345, 44 pages.
Non-Final Office Action dated Oct. 15, 2012 for U.S. Appl. No. 13/523,778, 21 pages.
Final Office Action dated Dec. 20, 2012 for U.S. Appl. No. 12/958,146, 23 pages.
Non-Final Office Action dated Dec. 28, 2012 for U.S. Appl. No. 13/188,295, 37 pages.
Non-Final Office Action dated Jan. 3, 2013 for U.S. Appl. No. 13/188,300, 36 pages.
Non-Final Office Action dated Nov. 8, 2012 for U.S. Appl. No. 13/204,535, 30 pages.
Final Office Action dated Jan. 25, 2013 for U.S. Appl. No. 13/554,285, 20 pages.
Non-Final Office Action dated Mar. 19, 2013 for U.S. Appl. No. 13/174,541, 46 pages.
Final Office Action dated Feb. 13, 2013 for U.S. Appl. No. 13/220,083, 48 pages.
Final Office Action dated Feb. 22, 2013 for U.S. Appl. No. 13/188,345, 45 pages.
Final Office Action dated Mar. 15, 2013 for U.S. Appl. No. 13/204,535, 18 pages.
Non-Final Office Action dated Mar. 19, 2013 for U.S. Appl. No. 13/284,497, 46 pages.
Non-Final Office Action dated Apr. 19, 2013 for U.S. Appl. No. 13/277,595, 58 pages.
Final Office Action dated Jul. 5, 2017 for U.S. Appl. No. 15/191,877, 32 pages.
Non-Final Office Action dated Jul. 25, 2017 for U.S. Appl. No. 15/422,147, 86 pages.
Non-Final Office Action dated Aug. 24, 2017 for U.S. Appl. No. 14/881,335, 125 pages.
Notice of Allowance dated Aug. 16, 2017 for U.S. Appl. No. 14/877,915, 63 pages.
Non-Final Office Action dated Oct. 4, 2017 for U.S. Appl. No. 15/235,502, 80 pages.
Non-Final Office Action dated Sep. 28, 2017 for U.S. Appl. No. 15/344,468, 107 pages.
Non-Final Office Action dated Sep. 28, 2017 for U.S. Appl. No. 15/132,220, 29 pages.
Non-Final Office Action dated Oct. 18, 2017 for U.S. Appl. No. 15/629,366, 131 pages.
Non-Final Office Action dated Oct. 16, 2017 for U.S. Appl. No. 15/131,793, 84 pages.
Non-Final Office Action dated Nov. 15, 2017 for U.S. Appl. No. 15/191,877, 30 pages.
Final Office Action dated Jan. 8, 2018 for U.S. Appl. No. 15/132,220, 30 pages.
Non-Final Office Action dated Jan. 24, 2018 for U.S. Appl. No. 15/603,416, 99 pages.
Final Office Action dated Feb. 13, 2018 for U.S. Appl. No. 14/881,335, 54 pages.
Final Office Action dated Mar. 30, 2018 for U.S. Appl. No. 15/235,502, 14 pages.
Final Office Action dated Mar. 27, 2018 for U.S. Appl. No. 15/629,366, 23 pages.
Non-Final Office Action dated May 2, 2018 for U.S. Appl. No. 14/704,949, 95 pages.
Non-Final Office Action dated May 11, 2018 for U.S. Appl. No. 15/132,220, 29 pages.
Non-Final Office Action dated May 30, 2018 for U.S. Appl. No. 15/629,366, 30 pages.
Non-Final Office Action dated May 31, 2018 for U.S. Appl. No. 15/603,421, 91 pages.
Non-Final Office Action dated May 29, 2018 for U.S. Appl. No. 14/881,335, 63 pages.
Final Office Action dated Jun. 13, 2018 for U.S. Appl. No. 15/191,877, 33 pages.
Notice of Allowance dated May 21, 2018 for U.S. Appl. No. 15/344,468, 45 pages.
Non-Final Office Action dated Aug. 27, 2018 for U.S. Appl. No. 16/006,942, 24 pages.
Notice of Allowance dated Oct. 19, 2018 for U.S. Appl. No. 14/704,949, 24 pages.

(56) References Cited

OTHER PUBLICATIONS

Ouyang, Y. & Fallah, M. H., "The Impact of Cell Site Re-homing on the Performance of UMTS Core Networks", International Journal of Next Generation Network (IJ NGN), vol. 2, No. 1, Mar. 2010.
Office Action dated Nov. 8, 2018 for U.S. Appl. No. 14/881,335, 68 pages.
Office Action dated Nov. 19, 2018 for U.S. Appl. No. 16/108,060, 27 pages.
Office Action dated Nov. 27, 2018 for U.S. Appl. No. 15/629,366, 35 pages.
Notice of Allowance dated Aug. 12, 2013 for U.S. Appl. No. 13/174,541, 40 pages.
Final Office Action dated Aug. 2, 2013 for U.S. Appl. No. 13/188,295, 26 pages.
Final Office Action dated Aug. 2, 2013 for U.S. Appl. No. 13/188,300, 38 pages.
Non-Final Office Action dated Jun. 20, 2013 for U.S. Appl. No. 13/219,911, 61 pages.
Non-Final Office Action dated Jul. 17, 2013 for U.S. Appl. No. 13/188,345, 27 pages.
Non-Final Office Action dated Jun. 20, 2013 for U.S. Appl. No. 13/291,917, 52 pages.
Non-Final Office Action dated May 31, 2013 for U.S. Appl. No. 13/523,770, 40 pages.
Non-Final Office Action dated Sep. 19, 2013 for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 85 pages.
RouteFinder 3.00 for ArGIS Documentation, ©2007 Routeware and Higher Mapping Solutions, 71 pages, downloaded from http://www.routeware.dk/download/routefinder_arcgis.pdf.
MySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013 for U.S. Appl. No. 13/284,497, 30 pages.
Final Office Action dated Aug. 22, 2013 for U.S. Appl. No. 13/277,595, 36 pages.
Final Office Action dated Oct. 21, 2013 for U.S. Appl. No. 13/523,770, 24 pages.
Final Office Action dated Nov. 5, 2013 for U.S. Appl. No. 13/188,345, 30 pages.
Non-Final Office Action dated Dec. 11, 2013 for U.S. Appl. No. 13/188,295, 52 pages.
Non-Final Office Action dated Dec. 24, 2013 for U.S. Appl. No. 13/188,300, 44 pages.
Final Office Action dated Dec. 11, 2013 for U.S. Appl. No. 13/291,917, 48 pages.
Final Office Action dated Jan. 15, 2014 for U.S. Appl. No. 13/219,911, 38 pages.
Final Office Action dated Jan. 28, 2014 for U.S. Appl. No. 12/958,146, 24 pages.
Notice of Allowance dated Feb. 14, 2014 for U.S. Appl. No. 13/284,456, 47 pages.
Final Office Action dated Feb. 24, 2014 for U.S. Appl. No. 13/927,020, 18 pages.
Marko Silventoinen, Timo Rantalainen, "Mobile Station Locating in GSM" Helsinki, Finland, Last accessed on Nov. 15, 2011, 7 pages.
Non-Final Office Action dated Dec. 30, 2013 for U.S. Appl. No. 13/305,267, 10 pages.
Final Office Action dated May 21, 2013 for U.S. Appl. No. 13/305,276, 28 pages.
Non-Final Office Action dated Oct. 24, 2012 for U.S. Appl. No. 13/305,276, 37 pages.
Locate your friends in real time with Google Latitude. http://googlemobile.blogspot.com/2009/02/locate-your-friends-in-real-time-with.html. Last accessed Mar. 8, 2012, 23 pages.
Location sharing and updating. http://support.google.com/mobile/bin/answer.py?hl=en&answer=136647. Last accessed Mar. 8, 2012, 3 pages.
Privacy Settings. http://support.google.com/mobile/bin/answer.py?hl=en&answer=136650, Last accessed Mar. 8, 2012, 1 page.
Final Office Action dated Nov. 25, 2013 for U.S. Appl. No. 13/447,069, 40 pages.
Non-Final Office Action dated May 9, 2013 for U.S. Appl. No. 13/447,069, 33 pages.
Janice Y. Tsai et al, Location-Sharing Technologies: Privacy Risks and Controls, pp. 1-26, Feb. 2010.
Nan Li et al, Sharing Location in Online Social Networks, pp. 20-25, IEEE Network, Oct. 2010.
Janice Y. Tsai et al, Who's Viewed You? The Impact of Feedback in a Mobile Location-Sharing Application, pp. 2003-2012, CHI.
Pettersen, et al., "Automatic antenna tilt control for capacity enhancement in UMTS FDD." Last accessed Mar. 25, 2012, 5 pages.
Islam, et al., "Self-Optimization of Antenna Tilt and Pilot Power for Dedicated Channels." Last accessed Mar. 25, 2012, 8 pages.
Bigham, et al., "Tilting and Beam-shaping for Traffic Load Balancing in WCDMA Network." Last accessed Mar. 25, 2012, 4 pages.
3GPP TS 25.215 V6.4.0 (Sep. 2005) Physical Layer Measurements, Sep. 2005.
3GPP TS 25.331 V6.9.0 (Mar. 2006) RRC protocol for the UE-UTRAN radio interface, Mar. 2006.
3GPP TS 25.413 V6.9.0 (Mar. 2006) UTRAN Iu interface RANAP signalling, Mar. 2006.
Calabrese, et al., "Real-Time Urban Monitoring Using Cell Phones: A Case Study in Rome". IEEE Transactions on Intelligent Transportation Systems, 12 pages. http://senseable.mit.edu/papers/pdf/2010_Calabrese_et_al_Rome_TITS.pdf).
Smith, et al., "Airsage Overview", Dec. 2011, 39 pages. http://mikeontraffic.typepad.com/files/raleigh-winter-2011-presentation-v11-final.pdf.
Non-Final Office Action dated Feb. 5, 2014 for U.S. Appl. No. 13/526,988, 56 pages.
Non-Final Office Action dated Mar. 25, 2014 for U.S. Appl. No. 13/488,144, 60 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Final Office Action dated Apr. 3, 2014 for U.S. Appl. No. 13/188,295, 37 pages.
Non-Final Office Action dated Apr. 8, 2014 for U.S. Appl. No. 13/175,199, 52 pages.
Non-Final Office Action dated Apr. 23, 2014 for U.S. Appl. No. 13/291,917, 29 pages.
Non-Final Office Action dated Apr. 22, 2014 for U.S. Appl. No. 13/447,069, 51 pages.
Non-Final Office Action dated Sep. 20, 2012 for U.S. Appl. No. 12/870,254, 29 pages.
Non-Final Office Action dated May 14, 2014 for U.S. Appl. No. 13/660,689, 62 pages.
Final Office Action dated May 9, 2014 for U.S. Appl. No. 13/188,136, 43 pages.
Squires, "Practical Physics", Cambridge University Press, p. 12, 1986, 3 pages.

(56) References Cited

OTHER PUBLICATIONS

Represent. (2000). In Collins English dictionary. Retrieved on May 9, 2014 from http://search.credoreference.com/content/entry/hcengdict/represent/, 2 pages.
Represent. (2001). In Chambers 21 st century dictionary. Retrieved on May 9, 2014 from http://search.credoreference.com/content/entry/chambdict/represent/.
Represent. (2011). In the american heritage dictionary of the english language. Retrieved on May 9, 2014 from http://search.credoreference.com/content/entry/hmdictenglang/represent/.
Non-Final Office Action dated May 20, 2014 for U.S. Appl. No. 13/551,369 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Non-Final Office Action dated Jun. 18, 2014 for U.S. Appl. No. 13/305,276, 26 pages.
Non-Final Office Action dated Jun. 26, 2014 for U.S. Appl. No. 13/557,425, 24 pages.
Non-Final Office Action dated Jun. 30, 2014 for U.S. Appl. No. 13/305,267, 44 pages.
Notice of Allowance dated Jul. 7, 2014 for U.S. Appl. No. 13/188,295, 51 pages.
Non-Final Office Action dated Jul. 22, 2014 for U.S. Appl. No. 12/958,146, 38 pages.
Notice of Allowance dated Jul. 22, 2014 for U.S. Appl. No. 13/525,065, 82 pages.
Notice of Allowance dated Jul. 22, 2014 for U.S. Appl. No. 13/188,300, 49 pages.
Non-Final Office Action dated Aug. 8, 2014 for U.S. Appl. No. 13/284,497, 48 pages.
Non-Final Office Action dated Aug. 11, 2014 for U.S. Appl. No. 14/279,176, 22 pages.
Notice of Allowance dated Aug. 21, 2014 for U.S. Appl. No. 13/447,069, 78 pages.
Final Office Action dated Aug. 28, 2014 for U.S. Appl. No. 13/526,988, 83 pages.
Final Office Action dated Sep. 22, 2014 for U.S. Appl. No. 13/175,199, 62 pages.
Non-Final Office Action dated Oct. 17, 2014 for U.S. Appl. No. 13/204,535, 47 pages.
Non-Final Office Action dated Oct. 20, 2014 for U.S. Appl. No. 13/494,959, 64 pages.
Final Office Action dated Oct. 22, 2014 for U.S. Appl. No. 13/557,425, 59 pages.
Final Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Final Office Action dated Dec. 11, 2014 for U.S. Appl. No. 13/447,072, 28 pages.
Non-Final Office Action dated Dec. 1, 2014 for U.S. Appl. No. 13/495,756, 76 pages.
Non-Final Office Action dated Jan. 7, 2015 for U.S. Appl. No. 13/557,425, 30 pages.
Notice of Allowance dated Jan. 21, 2015 for U.S. Appl. No. 13/495,391, 98 pages.
Notice of Allowance dated Feb. 6, 2015 for U.S. Appl. No. 13/204,535, 20 pages.
Non-Final Office Action dated Feb. 13, 2015 for U.S. Appl. No. 14/516,286, 62 pages.
Non-Final Office Action dated Feb. 13, 2015 for U.S. Appl. No. 13/188,136, 44 pages.
Girardin, et al., "Digital footprinting: Uncovering tourists with user generated content." Pervasive Computing, IEEE 7.4, Oct.-Nov. 2008. 8 pages.
Steinfield, "The development of location based services in mobile commerce." ELife after the Dot Com Bust. PhysicaVertagHD, 2004. 15 pages.
Sevtsuk, et al., "Does urban mobility have a daily routine? Learning from the aggregate data of mobile networks." Journal of Urban Technology, vol. 17, No. 1, Apr. 2010: 20 pages.
Buhalis, et al., "Information communication technology revolutionizing tourism." Tourism Recreation Research, vol. 30, No. 3, 2005. 10 pages.
Ratti, et al. "Mobile Landscapes: using location data from cell phones for urban analysis." Environment and Planning B: Planning and Design, vol. 33, 2006, 23 pages.
Non-Final Office Action dated Apr. 16, 2015 for U.S. Appl. No. 14/521,431, 82 pages.
Notice of Allowance dated Mar. 19, 2015 for U.S. Appl. No. 13/494,959, 41 pages.
Notice of Allowance dated Mar. 26, 2015 for U.S. Appl. No. 14/276,688, 90 pages.
Final Office Action dated May 1, 2015 for U.S. Appl. No. 13/557,425, 33 pages.
Non-Final Office Action dated May 14, 2015 for U.S. Appl. No. 14/530,605, 72 pages.
Non-Final Office Action dated Jun. 1, 2015 for U.S. Appl. No. 13/447,072, 38 pages.
Final Office Action dated Jun. 2, 2015 for U.S. Appl. No. 14/516,286, 20 pages.
Non-Final Office Action dated May 20, 2015 for U.S. Appl. No. 13/526,988, 52 pages.
Final Office Action dated Jun. 9, 2015 for U.S. Appl. No. 13/495,756, 35 pages.
Notice of Allowance dated Jul. 8, 2015 for U.S. Appl. No. 14/548,901, 146 pages.
Buford, et al., "Location Privacy Enforcement in a Location-Based Services Platform", 6th IEEE Consumer communications and Networking Conference, Jan. 2009. Retrieved on Jul. 8, 2015, 5 pages.
Philips, Jr. et al., "Information Sharing and Security in Dynamic Coalitions", SACMAT '02 Proceedings of the seventh ACM symposium on Access control models and technologies, 2002. Retrieved on Jul. 8, 2015, 10 pages.
Moniruzzaman, et al., "A Study of Privacy Policy Enforcement in Access Control Models", Proceedings of 13th International Conference on Computer and Information Technology, Dec. 2010, Retrieved on Jul. 8, 2015, 6 pages.
Final Office Action dated Jul. 22, 2015 for U.S. Appl. No. 13/188,136, 32 pages.
"CELL_DCH", in INACON Glossary, published online at [http://www.inacon.de/glossary/CELL_DCH.php] retrieved on Jul. 22, 2015, 1 page.
Non-Final Office Action dated Sep. 17, 2015 for U.S. Appl. No. 13/495,756, 23 pages.
Non-Final Office Action dated Sep. 14, 2015 for U.S. Appl. No. 13/557,425, 32 pages.
Non-Final Office Action dated Sep. 18, 2015 for U.S. Appl. No. 14/641,247, 69 pages.
Notice of Allowance dated Aug. 27, 2015 for U.S. Appl. No. 14/521,431, 39 pages.
Non-Final Office Action dated Nov. 16, 2015 for U.S. Appl. No. 13/188,136, 33 pages.
"Error", The American Heritage(R) Dictionary of the English Language, 2011, Houghton Mifflin Company, Boston, MA, 2 pages. Retrieved from [http://search.credoreference.com/contentientry/hmdictenglang/error/O] on Nov. 16, 2015.
Non-Final Office Action dated Nov. 23, 2015 for U.S. Appl. No. 14/520,287, 80 pages.
Non-Final Office Action dated Nov. 16, 2015 for U.S. Appl. No. 14/566,657, 87 pages.
Final Office Action dated Nov. 30, 2015 for U.S. Appl. No. 13/447,072, 45 pages.
Non-Final Office Action dated Dec. 18, 2015 for U.S. Appl. No. 14/548,901, 35 pages.

(56) References Cited

OTHER PUBLICATIONS

Non-Final Office Action dated Dec. 31, 2015 for U.S. Appl. No. 14/952,609, 32 pages.
Final Office Action dated Dec. 1, 2015 for U.S. Appl. No. 13/526,988, 43 pages.
Non-Final Office Action dated Jan. 11, 2016 for U.S. Appl. No. 13/175,199, 29 pages.
Non-Final Office Action dated Mar. 11, 2016 for U.S. Appl. No. 14/743,076, 86 pages.
Notice of Allowance dated Mar. 16, 2016 for U.S. Appl. No. 14/520,287, 23 pages.
Non-Final Office Action dated Mar. 18, 2016 for U.S. Appl. No. 13/447,072, 37 pages.
Final Office Action dated Apr. 5, 2016 for U.S. Appl. No. 13/188,136, 33 pages.
Non-Final Office Action dated Apr. 13, 2016 for U.S. Appl. No. 14/877,915, 76 pages.
Non-Final Office Action dated May 17, 2016 for U.S. Appl. No. 15/074,622, 18 pages.
Final Office Action dated Jun. 10, 2016 for U.S. Appl. No. 14/548,901, 33 pages.
Non-Final Office Action dated Jun. 22, 2016 for U.S. Appl. No. 14/970,533, 84 pages.
Non-Final Office Action dated Jun. 28, 2016 for U.S. Appl. No. 15/132,220, 17 pages.
Notice of Allowance dated Jul. 19, 2016 for U.S. Appl. No. 14/952,609, 99 pages.
Non-Final Office Action dated Aug. 24, 2016 for U.S. Appl. No. 14/676,066, 107 pages.
Final Office Action dated Aug. 25, 2016 for U.S. Appl. No. 13/447,072, 38 pages.
Non-Final Office Action dated Sep. 30, 2016 for U.S. Appl. No. 14/957,525, 72 pages.
Notice of Allowance dated Oct. 7, 2016 for U.S. Appl. No. 14/548,901, 45 pages.
Final Office Action dated Oct. 12, 2016 for U.S. Appl. No. 14/877,915, 34 pages.
Notice of Allowance dated Nov. 16, 2016 for U.S. Appl. No. 15/186,410, 80 pages.
Non-Final Office Action dated Dec. 28, 2016 for U.S. Appl. No. 13/447,072, 34 pages.
Non-Final Office Action dated Feb. 14, 2017 for U.S. Appl. No. 14/641,242, 120 pages.
Non-Final Office Action dated Jan. 13, 2017 for U.S. Appl. No. 14/601,800, 95 pages.
Non-Final Office Action dated Jan. 26, 2017 for U.S. Appl. No. 14/877,915, 30 pages.
Non-Final Office Action dated Feb. 15, 2017 for U.S. Appl. No. 15/191,877, 104 pages.
Non-Final Office Action dated Feb. 27, 2017 for U.S. Appl. No. 15/132,220, 91 pages.
Notice of Allowance dated Apr. 10, 2017 for U.S. Appl. No. 14/676,066, 33 pages.
Notice of Allowance dated May 8, 2017 for U.S. Appl. No. 15/466,853, 18 pages.
Notice of Allowance dated May 19, 2017 for U.S. Appl. No. 15/261,841, 83 pages.
Final Office Action dated Jun. 19, 2017 for U.S. Appl. No. 13/447,072, 47 pages.
Final Office Action dated Jun. 12, 2017 for U.S. Appl. No. 15/132,220, 25 pages.
Office Action dated Jan. 31, 2019 for U.S. Appl. No. 16/006,942, 112 pages.
Office Action dated Mar. 20, 2019 for U.S. Appl. No. 15/629,366, 26 pages.
Non-Final Office Action received for U.S. Appl. No. 16/434,164 dated Jul. 22, 2019, 24 pages.
Office Action dated Oct. 18, 2019 for U.S. Appl. No. 15/917,348, 118 pages.

* cited by examiner

US 10,516,972 B1

EMPLOYING AN ALTERNATE IDENTIFIER FOR SUBSCRIPTION ACCESS TO MOBILE LOCATION INFORMATION

TECHNICAL FIELD

The disclosed subject matter relates to facilitating access to location information related to mobile devices, including sourcing location information related to mobile devices based on an alternate identifier that is correlated to primary identifier of a mobile radio component.

BACKGROUND

By way of brief background, mobile location information can be a highly valued data component for a multitude of applications. Mobile location information can be leveraged to facilitate delivery of real-time advertising, notifications, to establish behavior patterns of individuals, aggregated into anonymized data sets for optimal placement of infrastructure and/or services, for law enforcement purposes, etc. Conventional network location technologies can generally be associated with limitations, such as being limited to a particular carrier, particular device type, or require rollout of additional infrastructure, etc., that can, for example, limit success rates to anywhere between about 15% to 80%. This broad range of possible failures, e.g., of about 20% to 85% based on the about 15-80% success rate, for capturing relevant location data can be a significant cause of uncertainty among consumers of such location information, e.g., the significant uncertainty can impact pricing, confidence, or reliance on conventionally ascertained location information. As an example, where location data for a region is requested from a carrier, the successful return of location data for all mobile devices in that region can be limited by the percentage of customers using the carrier as opposed to other carriers. The successful return of location data can further be limited in the example for devices also needing to be enabled for the location technology being employed, as opposed to older devices that may not have said location technology. Moreover, the successful return of location data can also be further limited by the scope of infrastructure the example carrier has rolled out to capture potential location information. Other deficiencies of conventional location information technologies may become apparent from the description of the various embodiments of the subject application below.

DETAILED DESCRIPTION

Figure 1:
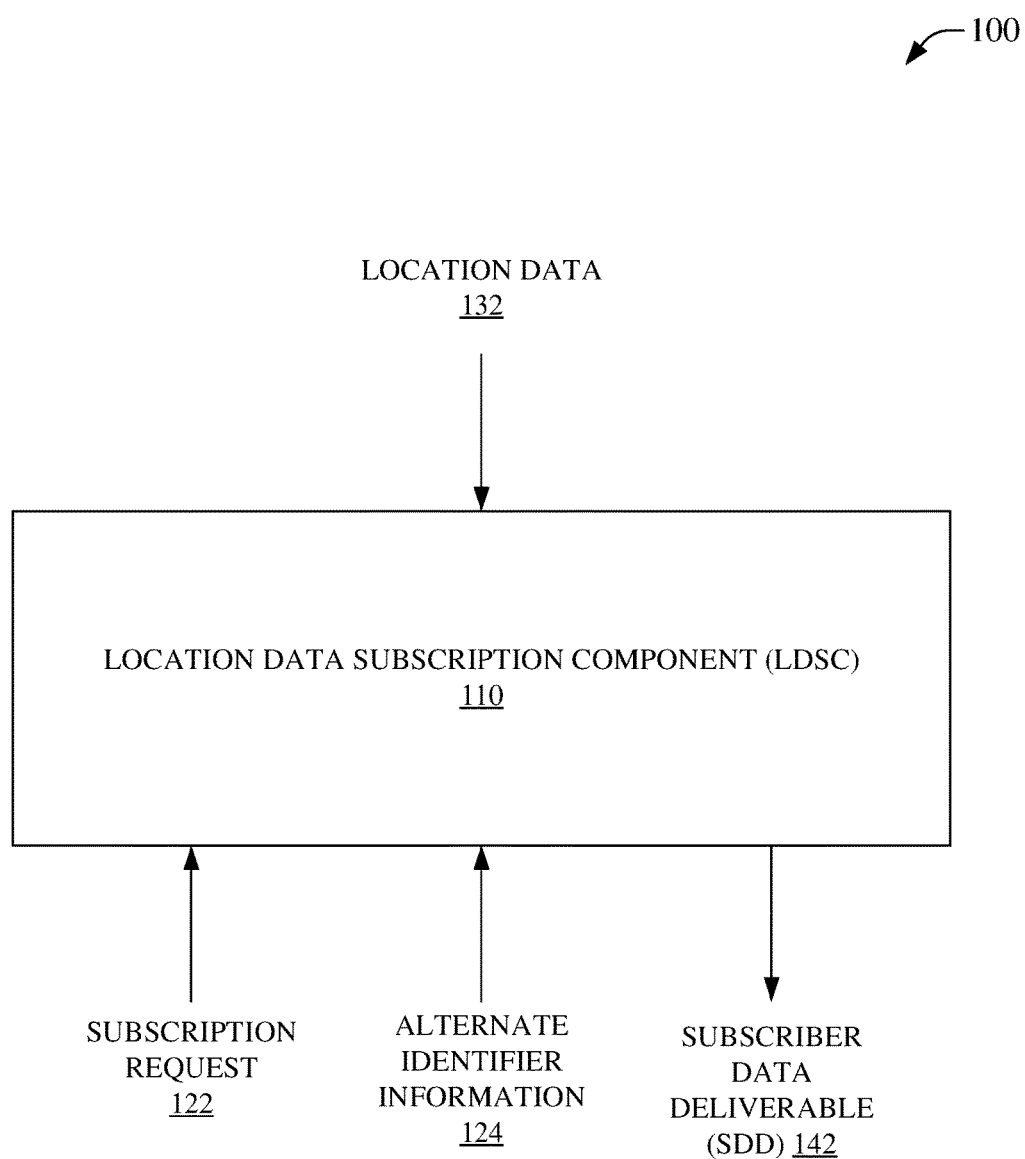
FIG. 1 is an illustration of an example system that facilitates access to mobile device location information in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional network location technologies can be associated with notable limitations, e.g., particular carrier, particular device type, supporting infrastructure, etc. A lack of third party consumer confidence in the reliability of mobile location information can affect the consumption of such information by a third party consumer. Improvements in the mobile location information technology can greatly improve on conventional technologies.

In contrast to conventional network location technologies, the instant disclosure can provide for near real time access to location records that can be device/carrier agnostic, e.g., where the location can be determined based on timing differentials for carrier signals between any mobile device and any access point pair, etc. Additionally, in some embodiments, location related information can be pushed out to a third party as the information becomes available, thereby reducing the need for the third party to make multiple requests for location related data. It will be noted that while some embodiments of the presently disclosed subject matter illustrate use of timed fingerprint location (TFL) information, e.g., as can be related to network event locating system (NELOS) technology, etc., other embodiments can employ another reliable and accurate location determining technology without departing form the scope of the instant disclosure. Further, some embodiments, e.g., TFL information/ NELOS technologies, can incorporate rules that facilitate access to location information of mobile devices in an idle state, which can provide rich context with regard to the location of a mobile device without significantly taxing the resources of the mobile device as might be expected in more conventional technologies.

Additional embodiments can apply rules to enable control of data capture, data analysis, and subscription management, for indicated mobile device identities. As an example, where a third party subscriber identifies a plurality of mobile devices for which location related information is desired, rules can be applied that can apply to all, some, one, or none of the plurality of mobile devices, e.g., a first rule can request that location information for all devices be provided at least hourly, a second rule can request that location information within a determined distance of a locus be provided as soon as possible, and a third rule can request that mobile device identities associated with a user age value of less than 18 years be withheld, etc. Depending on how the first, second, third rule, etc., are organized, these rules can result in access to different data packages for the third party subscriber according to the goals of the third party subscriber.

In some embodiments, location data subscription components can be integrated into carrier-side equipment or devices. In other embodiments, location data subscription components can be operated on non-carrier controlled equipment or devices. As an example, a location data subscription component can be part of a carrier gateway device, a carrier server, a carrier NodeB, etc. As another example, a location data subscription components operated in a virtual machine in a cloud environment, operate on a non-carrier corporate server, on a mobile virtual network operator (MVNO) gateway, etc.

Certain embodiments of the disclosed subject matter can provide for interaction with a UE location data source to provide for some aspects of the instant disclosure. As an example, a UE can receive instructions or a rule directing that the UE cache idle-state timing information such that this idle-state information can be communicated when the UE is in a future active-state. As another example, loci can be provided to the UE along with a rule indicating that the UE should enter an active-state when the UE position satisfies a rule related to a locus of the loci. As a further example, a UE can receive a rule requesting that location information be provided in conjunction with an event, date, time, location, state transition, device parameter such as battery level, processor usage, available memory, etc., weather condition, use of an application on the UE, schedule, etc.

In an aspect, an alternative identifier can be employed to access location information, information that enables determining a location, etc. Mobile network providers can generally employ internal identifiers to associate data, e.g., location data, timing data, subscription data, etc., to a mobile device component, as an example, an international mobile equipment identity (IMEI) can be used to track location for a device designated by the IMEI. Similarly, international mobile subscriber identity (IMSI), mobile subscription identification number (MSIN), mobile station international subscriber directory number (MSISDN), etc., can be employed within the scope of the disclosed subject matter. However, other entities can associate other alternate identifiers with a mobile device component, a device comprising a mobile device component, a vehicle having a mobile device component, etc. As an example, a vehicle identification number (VIN) of a vehicle can be employed by an entity to track data associated with said vehicle and it can be desirable for the entity to associate the VIN with the location of the vehicle, e.g., the location of a mobile device component comprised in the vehicle. As such, where a network provider and another entity can use different identifiers, it can be desirable for a location subscription system to facilitate use of alternate identifiers, e.g., a subscriber can provide a VIN that can be used to access location information that can be associated with a corresponding IMEI, etc. In an example, a fleet operator can track their delivery vehicles by VIN, license plate, fleet vehicle number, etc., and this alternate identifier can be employed in the presently disclosed subject matter to access location information that can be associated with another, e.g., primary, etc., identifier, such as an IMEI, subscriber number, etc., that can be used by a wireless network provider to track a location of a device in the network. Moreover, in some embodiments, the alternate identifier can be provided by a subscribing entity, by a manufacturing entity, by a regulatory agency entity, etc., for affiliation with a primary identifier employed in a mobile device location data system. As examples, a car manufacturer can provide a cellular carrier with VIN numbers corresponding to a primary mobile radio identifier for a mobile radio installed in the car at the time of manufacture; a state licensing agency can provide a license plate number corresponding to a primary radio identifier for a mobile radio of a vehicle; a fleet operator can provide a fleet vehicle number that corresponds to a primary radio identifier for a mobile radio of a vehicle; a cargo container shipping entity can provide a cargo container identifier that corresponds to a primary radio identifier for a mobile radio comprised in a cargo container; etc. It is noted that other examples are not recited for the sake of clarity and brevity, but that all such examples are within the scope of the present disclosure.

It will be noted that the use of the terms "location", "location data", or other similar terms, can expressly include information identifying a location, region, area, etc., timing information related to determining a location, additional information in addition to a location or timing information, such as a time stamp, accuracy indicator, identifier(s), longitude/latitude/altitude, distance, proximity, beacon identities, images, sounds, motion, device parameters, etc., or derivatives of location or timing information such as direction of travel, speed, altitude, proximity, distance, mode or travel, moving or stopped time, etc., and, as such, should be generally treated broadly unless they are explicitly or inherently used in narrow manner. Moreover, it will be further noted that the terms "location", "location data", or other similar terms, as used herein, can expressly include timed fingerprint location (TFL) information, network event locating system (NELOS) information, and other similar types of information. Similarly, the terms "TFL", "TFL information", "NELOS", "NELOS information", or similar terms as used herein can expressly include location, location data, or the like.

TFL information can include location information or timing information related to determining a location. As such, a TFL component or NELOS component can facilitate access to location information for a UE, and TFL information can be information from systems in, or associated with, a timed fingerprint location wireless environment, such as a TFL component of a wireless telecommunications carrier, a NELOS component, etc. As a non-limiting example, a mobile device, including mobile devices not equipped with a GPS-type system, can be located by looking up timing information associated with the mobile device from a TFL information component or NELOS component.

In an aspect, TFL information can include information related to determining a differential value for a NodeB site pair and a bin grid frame of a bin grid frame array. A centroid region, e.g., possible locations between a NodeB site pair, for an observed time value associated with the NodeB site pair (NBSP) can be calculated and is related to a determined value, e.g., in units of chip, from the pair of NodeBs. When UE time data is accessed, a value look-up can be initiated, e.g., a lookup for "DV(?,X)". Relevant NBSPs can be prioritized as part of the look-up event. Further, the relevant NBSPs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This, for example, can return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to narrow the possible locations of the UE further by providing additional intersections among relevant bin grid sets. As such, employing TFL information for location determination is demonstrably different from conventional location determination techniques or systems such as GPS, eGPS, triangulation or multilateration in wireless carrier environments, near field techniques, or proximity sensors. TFL information can be employed for mobile devices in active states, and in some embodiments, can also be employed for mobile device in idle states.

In an aspect, TFL information can be particularly well suited to location analytic technologies in that TFL information lookup generally requires less computation that other location technologies. For example, in conventional multilateration systems, complex math is typically employed to convert a plurality of measured signals into a location. In contrast, TFL information is generally pre-computed and could employ simple lookup techniques to garner probable locations of a UE based on overlapping bin grid locations for a plurality of NodeB Site Pairs (NBSPs). Moreover, timing signals can be captured by a UE between active connections to a carrier to allow location histories, e.g., via historical TFL information on the UE, of devices with less consumption of network resources, battery power, etc.

In a further aspect, TFL information can be acquired based on timing signals already being received by a typical UE and, as such, additional power need not typically be expended, for example, on an additional radio receiver as would be common in more conventional location technologies such as GPS, in going active for conventional technologies such as trilateration/triangulation, etc. As an example, in contrast to a GPS system having a GPS receiver to receive GPS signals, a TFL enabled smartphone can employ wireless radio timing signals already associated with the wireless cellular service of the smartphone to determine location such that both location information and cellular service are accommodated on the same radio and additional energy for a second radio need not be expended. As such, TFL information can be well suited to portable user equipment that typically is both highly power conscious and relatively processor limited as compared to their non-mobile counterparts. It is to be appreciated that where the location of a mobile device can be achieved with TFL information without bogging down a processor or further increasing battery depletion in the mobile device, the use of TFL information is well suited for location analytics related to a mobile device.

In an embodiment, a system can comprise a processor and memory to facilitate performance of operations comprising receiving a request for mobile device location information from a subscribing device associated with a subscriber entity. In response to receiving NELOS information related to a location of a mobile device, access to the location data can be facilitated. This can be based on a parameter of the request satisfying a rule related to permission to access the location data.

In another embodiment, a method can comprise receiving a subscription request from a subscribing device. NELOS information related to a location of a UE can also be received. The subscribing device can access a data deliverable comprising information related to the NELOS information based on the subscription request.

In a further embodiment, a computer readable storage device can comprise instructions for receiving a request for mobile device location information from a subscribing device associated with a subscriber identity. Further, NELOS information related to a location of a mobile device can also be received. Location data can be generated in response to an analysis of the NELOS information based on the request. The location data can be shared with the subscribing device.

In an aspect, while terms like "user equipment (UE)," "mobile station," "mobile," subscriber station," "subscriber equipment," "access terminal," "terminal," "handset," and similar terminology, can conventionally refer to a wireless device utilized by a wireless services subscriber or user of a wireless communication service to receive or convey data, control, voice, video, sound, gaming, or substantially any data-stream or signaling-stream, in instances where there are multiple types of subscriptions, the terms can also refer to aspects of each subscription service. As an example, where a UE accesses a wireless cellular service according to a subscription with a wireless cellular carrier, this can be accomplished via a femtocell that harvests metadata for a remotely located device according to a subscription with the manufacturer of the femtocell. In this example, there is a UE that is a subscriber device of the wireless cellular service and another subscriber device, i.e., the remote device, subscribing to a service of the femtocell manufacturer. As such, it will be noted, that the term subscribing device, as used herein, can generally refer to a mobile device, a UE, vehicle comprising a mobile device component, device comprising a mobile device component, etc., subscribing to a mobile carrier service and/or, as dictated by context, can refer to other devices that subscribe to location services as provided in the context of the currently disclosed subject matter, e.g., devices, such as $3^{rd}$ party component 220, etc., accessing SDD 142, 242, etc. as disclosed in more detail herein below.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which facilitates access to mobile device location information in accordance with aspects of the subject disclosure. System 100 can comprise location data subscription component (LDSC) 110. LDSC 110 can receive subscription request 122. Subscription request 122 can comprise a parameter related to subscriber data deliverable (SDD) 142, such as frequency of reporting, a reporting trigger such as an event, proximity, time, identifier(s), etc., a type of returned data such as location, timing information, derivatives of location or timing information, etc., price, device, age, etc. LDSC 110 can receive alternate identifier information 124. In an aspect, alternative identifier information 124 can comprise an identifier other than a primary identifier, wherein the primary identifier can be an identifier used to identify a mobile device by a network provider employing LDSC 110. In an embodiment, alternate identifier information 124 can be an identifier employed by an entity providing subscription request 122. In certain embodiments alternate identifier information 124 can be comprised in subscription request 122. In other embodiments, alternate identifier information 124 can be provided separately, by a subscriber or other entity, as illustrated. In an example, alternate identifier information 124 can be a VIN where an entity desires to track a vehicle by the VIN rather than by a primary identifier, e.g., as used by a network provider entity, such as an IMSI number, etc. Whereas LDSC 110 can use alternate identifier information 124 to identify a corresponding primary identifier, alternate identifier information 124 can be used to provide access to subscriber data deliverable (SDD) 142. By enabling access to SDD 142 based on alternate identifier information 124, used of system 100 can be improved for a subscriber because they can simply provide alternate identifier information 124, which can be an identifier they already can use in other aspects of their operations, rather than having to track and provide a primary identifier that may be not otherwise be used by the subscribing entity.

LDSC 110 can further receive location data 132, which can comprise location data related to a mobile device or other UE. LDSC 110 can facilitate access to SDD 142 based on location data 132, subscription request 122, and alternate identifier information 124. SDD 142 can comprise a location, location data, TFL information, NELOS information, derivatives thereof, or other related information. In an embodiment, LDSC 110 can receive a location or location data, e.g., via location data 132, from a UE. Location data 132 can be received from, for example, a NELOS component, e.g., NELOS component 230 in FIG. 2, etc., from a UE directly, or via another component such as a data store, cloud environment device, etc. Location data 132 can, in some embodiments, comprise TFL or TFL information. Location data 132 can comprise near real time location or location data, historical location or location data, cached location or location data, etc. For the sake of clarity and brevity, the balance of the disclosed subject matter is generally discussed in terms of NELOS location information, TFL information, etc., although nearly any form of reliable location data, including present existing and/or future location technologies, or information that can be used to determine reliable location data is explicitly within the scope of the present disclosure. Moreover, the particulars of capturing, determining, or generating TFL, TFL information, or NELOS information is outside of the scope of the instant disclosure except where more particularly pointed out herein and to note that these types of location related information, e.g., TFL information, etc., is distinct from more conventional types of location related information, such as that from GPS, triangulation, trilateration, beacon ranging, etc. As such, the use of TFL, TFL information, NELOS information, NELOS technology, etc., in combination with the instant disclosure provides advantages over conventional technologies, such as, being device/provider independent, information sourcing that can consume less power and/or can consume fewer network resources, etc. Moreover, other modern location technologies or future location technologies can provide, albeit via different techniques, advantages that can cause them to be used preferentially even to TFL/NELOS technology within the framework of the present disclosure.

Location data 132 can be processed at LDSC 110 to generate SDD 142 that can then be made accessible to other components or devices. In an embodiment, location data 132 can be passed as SDD 142 without change where no change is indicated in the analysis of location data 132 in view of subscription request 122, e.g., where subscription request 122 indicates that SDD 142 should comprise all location data 132, then SDD 142 can be the same as location data 132. In other embodiments, location data 132 can be processed, analyzed, etc., such that SDD 142 comprises information derived from location data 132, e.g., SDD 142 is not the same as location data 132. As an example, where LDSC 110 analyzes location data 132 and determines that it comprises private information, this private information can be stripped out and the balance of the information can be made available as SDD 142. As another example, LDSC 110 can receive location data 132 comprising TFL/NELOS timing information and can convert the timing information to location information such that SDD 142 comprises location information rather than timing information. In a further example, LDSC 110 can receive location data 132 comprising information from a plurality of UEs and an aggregate of elements of this information can be included in SDD 142, such as where aggregating is indicated in subscription request 122. Numerous other examples are readily appreciated, and although not recited herein for the sake of brevity, such examples are to be considered within the scope of the instant disclosure.

Figure 2:
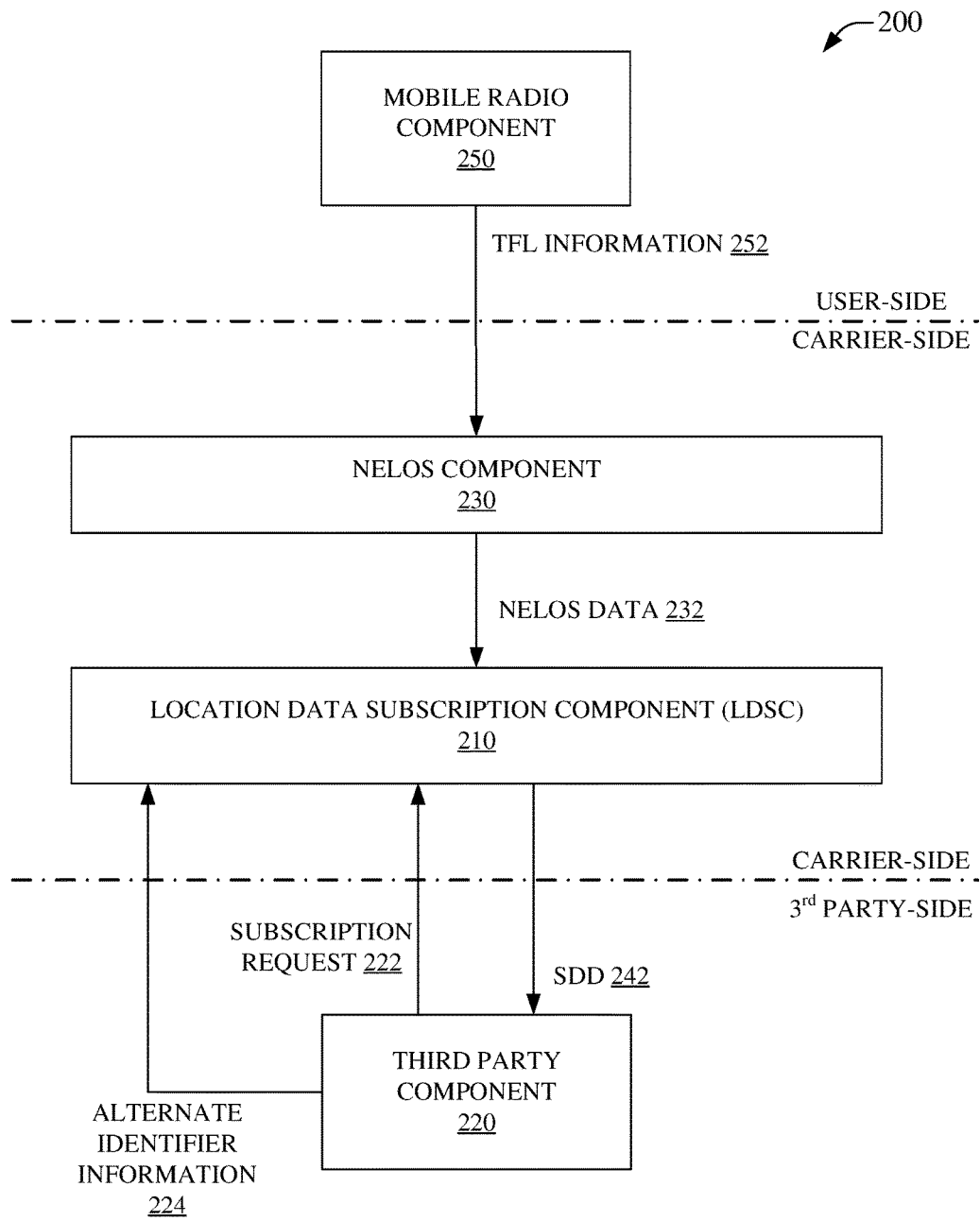
FIG. 2 is a depiction of an example system that facilitates access to mobile device location information by a third party based on an alternate identifier and in response to a subscription request in accordance with aspects of the subject disclosure.

In an embodiment, LDSC 110 can make control information, rules, etc., available to a NELOS component, such as NELOS component 230 in FIG. 2, etc., or to a UE, such as UE comprising mobile radio component 250 of FIG. 2, etc. As an example, a rule can be communicated to a UE via LDSC 110 that can allow the UE to selectively store location information, TFL information, etc., and return the stored information to LDSC 110 in accord with the rule. This aspect can enable a variety of component configurations comprising, for example, UEs sourcing location information or timing information, NELOS components determining TFL information, LDSC 110 receiving location data 132, and making SDD 142 available to other components or devices not illustrated in system 100. Some of these component configurations are illustrated in subsequent figures, though not all configurations are illustrated for clarity and brevity, although all such configurations are considered within the scope of the instant disclosure.

FIG. 2 is a depiction of a system 200 that can provide access to mobile device location information for a "third party" based on an alternate identifier and in response to a subscription request in accordance with aspects of the subject disclosure. System 200 can comprise LDSC 210. LDSC 210 can receive subscription request 222 from third party component 230. Third party component 230 can be a component or device associated with a third party, e.g., an entity other than a user-side entity such as a user of mobile radio component 250, or an entity other than a carrier-side entity such as a carrier operating NELOS component 230 or LDSC 210, etc. As an example, third party component can be an emergency services or police component, an advertiser's server, a mapping service's device, etc. Subscription request 222 can comprise a parameter related to SDD 242. LDSC 210 can further receive NELOS data 232, from NELOS component 230, which can comprise location data related to mobile radio component 250. LDSC 210 can facilitate access to SDD 242 based on NELOS data 232 and subscription request 222. SDD 242 can comprise a location, location data, TFL information, NELOS information, derivatives thereof, or other related information.

NELOS component 230 can receive TFL information 252 from mobile radio component 250. As such, NELOS component 230 can generate NELOS data 232 based on TFL information 252. In an embodiment NELOS data 232 can be the same as TFL information 252, e.g., NELOS component 230 can pass TFL information 252 through as NELOS data 232. In other embodiments, NELOS data 232 can be different from TFL information 252, such as where TFL information 252 can comprise timing information that can be converted to location information by NELOS component 230 such that NELOS data 232 can comprise location information in place of, or in addition to, the timing information of TFL information 252.

In an aspect, mobile radio component 250 can be logically considered as located on a user-side of a communication link. As an example, mobile radio component 250 can be considered to be on the user-side of a radio link with a NodeB that itself can be considered to be on a carrier-side of the radio link. In a further similar aspect, NELOS component 230 and/or LDSC component 210 can be logically considered as located on a carrier-side of a communication link. As an example, NELOS component 230 and/or LDSC component 210 can be located at a carrier core network component. In another similar aspect, third party component 220 can be logically considered to be located on a third party-side of a communication link. As an example, where LDSC 210 is located in a carrier core component, it can be communicatively linked to third party component 220 via an internet connection wherein third party component 220 is located other than on the carrier-side of the internet link(s). In an aspect, system 200 can illustrate a possible end-to-end configuration highlighting sourcing of data from the user-side, processing of data at the carrier-side, and delivery of data in response to a request from the third party-side. System 200 is not intended to limit the disclosure whereas numerous other configurations are readily appreciated and would be considered within the scope of the instant disclosure.

In an embodiment, LDSC 210 can receive a location or location data, e.g., TFL information 252, etc., via NELOS component 230, e.g., NELOS data 232, from mobile radio component 250. NELOS data 232 can comprise TFL or TFL information 252. As such, NELOS data 232 can comprise near real time location or location data, historical location or location data, cached location or location data, etc. These types of location related information, e.g., TFL information 252, etc., are distinct from more conventional types of location related information, such as that from GPS, triangulation, trilateration, beacon ranging, etc. As such, in an embodiment, the use of TFL information 252, NELOS information 232, etc., in combination with the instant disclosure can provide, as disclosed herein, advantages over conventional technologies.

In an aspect, NELOS data 232 can be processed at LDSC 210 to generate SDD 242. SDD 242 can be received by third party component 250. SDD 242 can be responsive to parameters of subscription request 222. Further, SDD 242 can be responsive to an alternate identifier of alternate identifier information 224. In an embodiment, subscription request 222 can represent a single SDD 242 request, e.g., one-time access to SDD 242. In other embodiments, subscription request 222 can represent a plural SDD 242 request, e.g., multiple access to updated SDD 242. In some embodiments, subscription request 222 can represent an ongoing SDD 242 request, e.g., ongoing access to updated SDD 242 within the scope of a subscription model. In an embodiment, SDD 242 can be 'pushed' to third party component 220 in an automated manner. This push-model can reduce multiple requests for access to SDD 242 from third party component 220. In another embodiment, third party component 220 can 'pull' SDD 242 from LDSC 210, e.g., requesting access to SDD 242, etc. In a further embodiment, LDSC 210 can publish SDD 242 and third party component 220 can access the published SDD 242. Other techniques facilitating access to SDD 242 are also to be considered within the scope of the present disclosure even where not recited for the sake of brevity.

In an aspect, alternate identifier information 224 can comprise an alternate identifier that can identify, for example a device of interest, e.g., location data for the device of interest can be returned via SDD 242 in response to subscription request 222 and alternate identifier information 224. In an embodiment alternate identifier information 224 can be separate from subscription request 222, as illustrated. In other embodiments, alternate identifier information 224 can be comprised in subscription request 222. Alternate identifier information 224 can facilitate use of an alternate identification system in requesting/subscribing to location data via third part component 220. In an aspect, this can allow use of an identifier that is distinct from a primary identifier used by LDSC 210. As such, a subscribing entity can indicate, using alternate identifier information 224 and subscription request 222, which device location information they wish to receive, via SDD 242, from LDSC 210. This can be a convenience for a subscriber and can improve efficiency of interacting with, e.g., the performance of, LDSC 210, and system 200. As an example, where a trucking company wishes to subscribe to the location of containers being trucked around the country, they can already have a list of container identifiers, which can be embodied in alternate identifier information 224 and communicated to LDSC 210 in conjunction with subscription request 222 requesting that location data be, for example, pushed to the trucking company hourly. The example list of container identifiers comprised in alternate identifier information 224, can be correlated to the primary identifiers, e.g., IMSIs, associated with mobile components 250 comprised in each container. This example illustrates that the mobile radios and LDSC can employ the primary identifiers, while allowing selection of data and processing to return an appropriate SDD 242 can be based on alternate identifier information 224. This example demonstrates that the trucking company does therefore not need to form queries using the primary identifier used by the rest of system 200, e.g., once the alternate identifier information 224 is correlated to primary identifiers, the alternate identifier information 224 can be employed directly in requesting SDD 242. In an embodiment, the correlation between alternate identifier information 224 and primary identifiers can be stored at LDSC 210, or other carrier-side components (not illustrated). In some embodiments, the correlation between alternate identifier information 224 and primary identifiers can even be stored at mobile radio component 250, at NELOS component 230, etc. In a further aspect, SDD 242 can comprise location data correlated to the primary identifier, an alternate identifier, or combinations thereof. In some embodiments, such as where mobile radio com p 250 is moved from one container to another container, alternate identifier information 224 can update the correlation between the alternate identifier and the primary identifier. Moreover, where subscription request 222 can be performed by third party component 220 in a relatively tightly integrated manner, the use of alternate identifier information 224 can improve usability of system 200, for example, by allowing selection and manipulation of location queries based on an alternate identification rather than a primary identification, which can reduce the operations that need to be performed to select the relevant identities, such as where the alternate identities include keywords that allow rapid selection by an operator of third party component 220, this can be much more efficient than having the same operator try to select corresponding primary identities that lack the keywords of the alternate identities.

Figure 3:
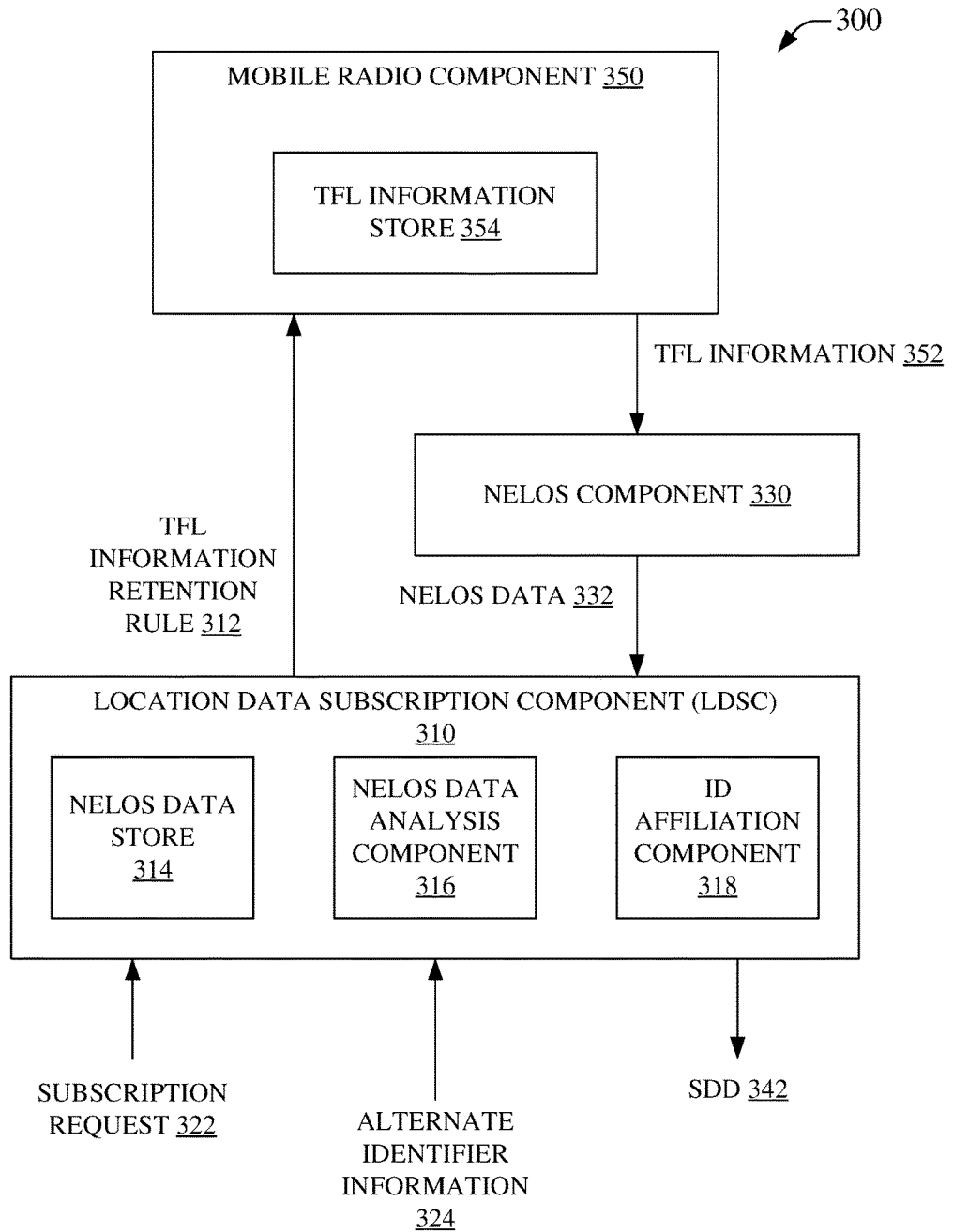
FIG. 3 illustrates an example system that facilitates access to mobile device location information and analysis, based on an alternate identifier, in accordance with aspects of the subject disclosure.

FIG. 3 illustrates a system 300 that facilitates access to mobile device location information and analysis, based on an alternate identifier, in accordance with aspects of the subject disclosure. System 300 can comprise LDSC 310. LDSC 310 can receive subscription request 322 and alternate identifier information 324. Subscription request 322 can comprise a parameter related to SDD 342. LDSC 310 can further receive NELOS data 332, from NELOS component 330, which can comprise location data related to mobile radio component 350. LDSC 310 can facilitate access to SDD 342 based on NELOS data 332, subscription request 322, and alternate identifier information 324. SDD 342 can comprise a location, location data, TFL information, NELOS information, derivatives thereof, or other related information.

LDSC 210 can comprise ID affiliation component 318 that can correlate a primary identifier with an alternate identifier, e.g., as can be received via alternate identifier information 324. In some embodiments, the correlation can be stored at LDSC 310 or other carrier-side devices to allow ready reuse of the correlation to later determine a primary identifier from a subsequently received alternate identifier. In a further aspect an alternate identifier can represent a group of primary identifiers. This aspect can allow subscription request 322 to be associated with groups comprising more than one mobile radio component 350. As an example, a taxi entity can employ an alternate identifier for taxis running in different cities, such that a subscription request 322 can request a location data push for a single alternate identifier that results in SDD 342 returning location data for all taxis affiliated with the single alternate identifier. This aspect can be accomplished, for example, by mapping the single alternate identity to multiple primary identities via ID affiliation component 318, etc.

NELOS component 330 can receive TFL information 352 from mobile radio component 350. As such, NELOS component 330 can generate NELOS data 332 based on TFL information 352. In an embodiment NELOS data 332 can be the same as TFL information 352, e.g., NELOS component 330 can pass TFL information 352 through as NELOS data 332. In other embodiments, NELOS data 332 can be different from TFL information 352, such as where TFL information 352 can comprise timing information that can be converted to location information by NELOS component 330 such that NELOS data 332 can comprise location information in place of, or in addition to, the timing information of TFL information 352. As such, NELOS data 332 can comprise near real time location or location data, historical location or location data, cached location or location data, etc. These types of location related information, e.g., TFL information 352, etc., are distinct from more conventional types of location related information, such as that from GPS, triangulation, trilateration, beacon ranging, etc. As such, the use of TFL information 352, NELOS information 332, etc., in combination with the instant disclosure can provide, as disclosed herein, advantages over conventional technologies.

In an aspect, NELOS data 332, once received by LDSC 310, can be stored at NELOS data store 314. NELOS data store 314 can further be employed to store and update SDD 342, such as storing and updating SDD 342 between accesses from a third party component, e.g., 220, etc. In an embodiment, LDSC 310 can receive more NELOS data 332 than can be associated with subscription request 322, whereby LDSC 310 can store the pertinent portion of NELOS data 332 at NELOS data store 314. In another embodiment, NELOS data store 314 can retain excess NELOS data 332 to allow for potential updates to subscription request 322. As an example, where other subscription requests indicate a trend to include proximity to a sporting event for a particular geographic region, LDSC 310 can begin storing proximity information at NELOS data store 314 for other subscribers even though they may not yet have requested that information. This can allow LDSC 310 to be more responsive in providing proximity information where the subscriptions are updated to request this additional information. LDSC 310 can analyze NELOS data 332 and/or data stored on NELOS data store 314 via NELOS data analysis component 316 to facilitate determining SDD 342. Nearly any analysis can be performed at NELOS data analysis component 316. As an example, data can be aggregated, personally identifying information can be removed, average values can be generated, trends can be determined, locations, modes of travel, etc.

In some embodiments, mobile radio component 350 can further comprise TFL information store 354. TFL information store 354 can store TFL information related to mobile radio component 350. In an aspect, this can be related to determining TFL information 352. Further, TFL information store 354 can store TFL information based on received TFL information retention rule 312. TFL information retention rule 312 can be related to types of information to be retained at TFL information store 354, amounts of information to be retained at TFL information store 354, filtering of information retained at TFL information store 354, etc. In an embodiment, TFL information 352 can comprise information from TFL information store 354.

Figure 4:
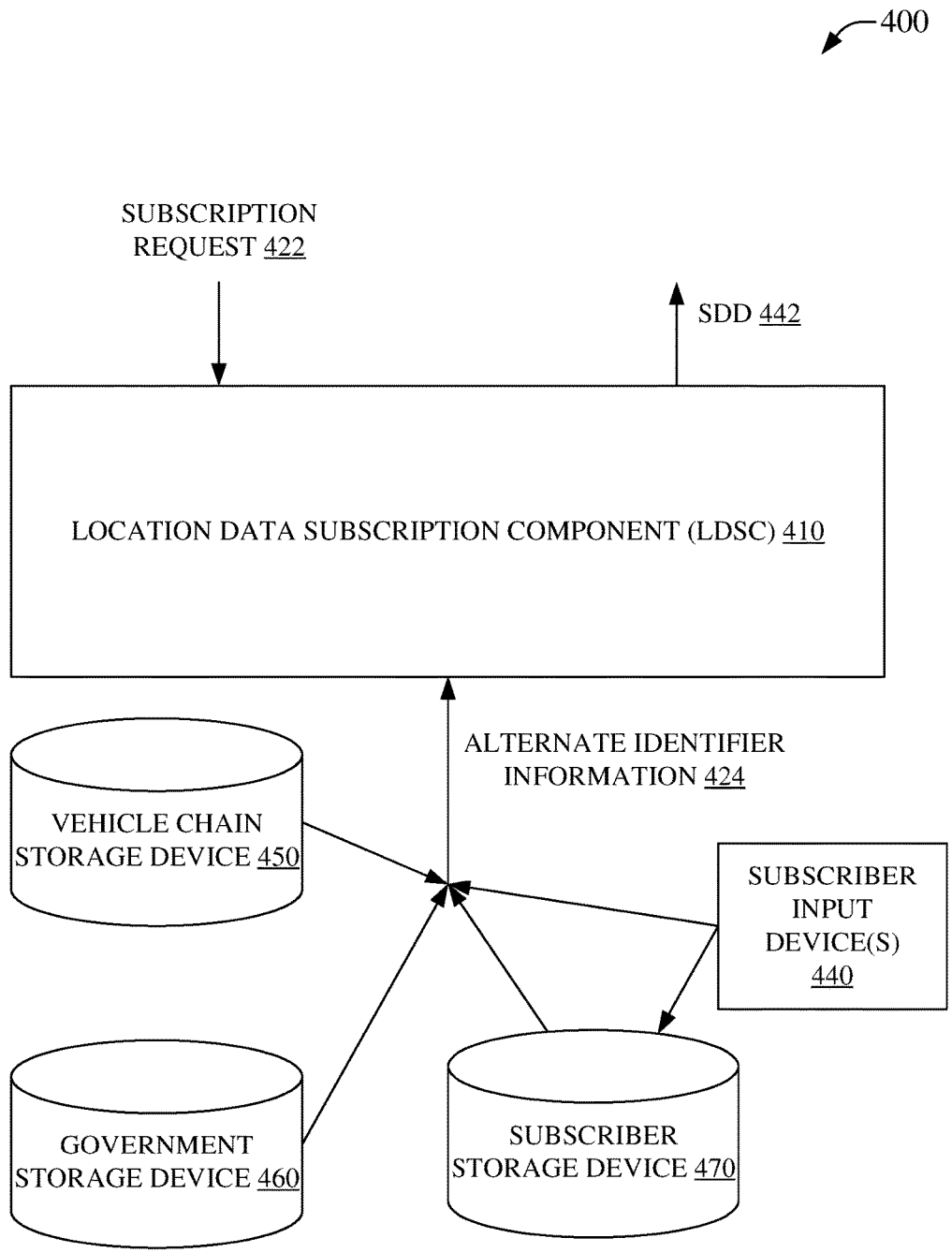
FIG. 4 illustrates an example system that facilitates access to mobile device location information based on an alternate identifier, wherein the alternate identifier is provided via another device for affiliation with a target mobile radio component, in accordance with aspects of the subject disclosure.

FIG. 4 illustrates a system 400 that facilitates access to mobile device location information based on an alternate identifier, wherein the alternate identifier is provided via another device for affiliation with a target mobile radio component, subject to subscription rules in accordance with aspects of the subject disclosure. System 400 can comprise LDSC 410. LDSC 410 can receive subscription request 422. Subscription request 422 can comprise a parameter related to SDD 442. LDSC 410 can further receive location data from a mobile radio component. LDSC 410 can facilitate access to SDD 442. SDD 422 can comprise location information responsive to subscription request 422 and alternate identifier information 424. SDD 442 can comprise a location, location data, TFL information, NELOS information, derivatives thereof, or other related information.

Alternate identifier information 424 can comprise one or more alternate identifiers that can correspond to one or more primary identifiers, as disclosed herein. In an aspect, alternate identifier information 424 can be received from subscriber input device(s) 440. Subscriber input device(s) 440 can enable an entity to input alternate identifier information 424 or data comprised therein. In an embodiment, subscriber input device(s) 440 can be a user interface that allows a user to input an alternate identifier and to indicate one or more primary identifier(s) that it corresponds to, for example, a user can input a VIN and an IMSI that the VIN corresponds to and, accordingly, alternate identifier information 424 can indicate to LDSC 410 that the VIN correlates to the IMSI, such that subscription request 422 indicating the VIN can return location data in SDD 442 corresponding to the IMSI. In another embodiment, subscriber input device(s) 440 can be a user interface that allows a user to input an alternate identifier and to indicate one or more primary identifier(s) that can be stored on subscriber storage device 470. The correlation between the alternate identifier and the primary identifier can then be access from subscriber storage device 470 for inclusion in alternate identifier information 424 that is received by LDSC 410.

In other aspects, alternate identifier information 424 can be received from another source, at a different time from a time that subscription request 422 is received, etc. In an embodiment, another source of alternate identifier information 424 can be vehicle chain storage device 450. Vehicle chain storage device 450 can be a storage device that stores affiliations between an alternate identifier, e.g., a VIN, serial number, fleet vehicle number, etc., and a primary identifier, e.g., an IMSI, phone number, serial number, etc., of a mobile radio component. As an example, vehicle chain storage device 450 can be a storage device of a car manufacturer, such that when the VIN is placed in the vehicle and a mobile radio component is place in the vehicle, the two can be affiliated and that affiliation can be recorded. In this example, the vehicle manufacturer can source the affiliation information to LDSC 410 via alternate identifier information 424. In an aspect, the example alternate identifier information 424 can be provided at a different time than subscription request 422 can be received from a subscribing entity, e.g., the alternate identifier information 424, for example, can be provided closer in time to the manufacture of the vehicle than to subscription request 422 being received by LDSC 410. As another example, a rental car company can affiliate rental vehicle identifiers with primary identifiers in an instance of vehicle chain storage device 450 which can be accessed, e.g., via alternate identifier information 424, to provide correlations to LDSC 410, which can occur at the same or different time as a time at which subscription request 422 is received by LDSC 410. In an aspect, vehicle chain storage device 450 can store and communicate, for a vehicle or other conveyance, by any entity in the chain of vehicle/conveyance operations, correlations between any alternate identity and one or more primary identities. Moreover, these correlations can be communicated to LDSC 410, via alternate identifier information 424, at a time that can be the same or different from times associated with receiving subscription request 422 at LDSC 410.

In an embodiment, alternate identifier information 424 can be sourced from government storage device 460. Government storage device 460 can be a storage device that stores affiliations between an alternate identifier, e.g., a VIN, serial number, fleet vehicle number, etc., and a primary identifier, e.g., an IMSI, phone number, serial number, etc., of a mobile radio component. As an example, government storage device 460 can be a storage device affiliated with a governmental or quasi-governmental organization, for example a department of licensing storage device, a department of wildlife storage device, an FBI storage device, etc. such that an alternate identifier can be associated with a primary identifier of a mobile radio component by the government. As an example, a state licensing department can associate a toll-road pass device with a vehicle's mobile radio component, such that a query of the toll-pass identifier can be affiliated with the location of the vehicle. Similar to vehicle chain storage device 450, government storage device 460 can provide alternate identifier information 424 at a time that is the same or different from a time of LDSC 410 receiving subscription request 422.

For vehicle chain storage device 450, government storage device 460, or subscriber storage device 470, affiliations between an alternate identifier and a primary identifier can be made accessible by LDSC 410 at a first time that can be the same or different as a second time of receiving subscription request 422. Moreover, at the second time, subscription request 422 can comprise an alternate identifier. As such, the alternate identifier from the second time can be used to determine a primary identifier based on the affiliation between the alternate identifier and the primary identifier received at the first time. In an aspect, the alternate identifier can be received in conjunction with subscription request 422 via subscriber input device(s) 440, e.g., where alternate identifier information is comprised separately from subscription request 422.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
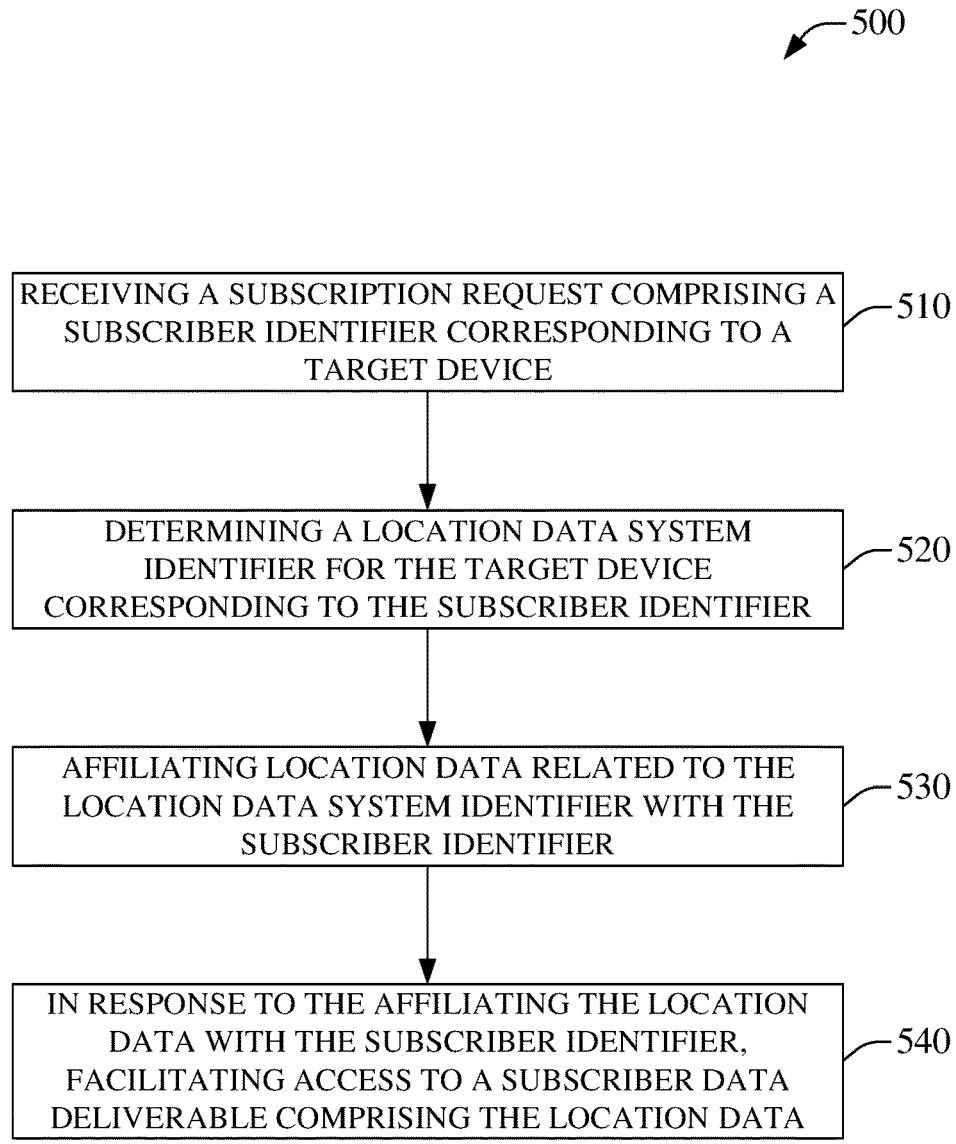
FIG. 5 illustrates an example method that facilitates access to mobile device location information based on an alternate identifier in accordance with aspects of the subject disclosure.

FIG. 5 illustrates a method 500 facilitating access to mobile device location information based on an alternate identifier in accordance with aspects of the subject disclosure. At 510, method 500 can comprise receiving a subscription request. The subscription request can comprise a subscriber identifier corresponding to a target device of a mobile carrier wireless network. The subscriber identifier can be, for example a VIN, a fleet vehicle identifier, a cargo container identifier, etc. In an aspect, the subscriber identifier can be correlated to a primary identifier, e.g., an identifier used by a mobile carrier entity to identify a mobile device accessing a mobile carrier wireless network. As an example, the primary identifier can be an IMEI, a serial number, etc. A subscription request can comprise a parameter related to location information to be made available, e.g., SDD 142, etc. The parameter can include aspects such as frequency of reporting, a reporting trigger, such as an event, proximity to a locus, a time, an elapsed time, an identifier(s), etc., a type of data to return, such as location type, timing type information, derivative type, etc., a price, a device or model, an age, etc. In an aspect, a subscription request can be received from an entity and can facilitate returning location information back to the entity, another entity, etc. In some embodiments, the subscription request can be a one-time data request, a multi-part data request, an on-going data request, etc.

At 520, method 500 can comprise determining a location data system identifier for the target device. The location data system identifier can be a primary identifier and can correspond to, or be affiliate to, the subscriber identity. In an aspect, the location data system identifier can be used to access location information corresponding to the target device. The location data can, in an embodiment, be TFL information, e.g., TFL information 252, etc., NELOS data, e.g., NELOS data 232, etc., or other location data related to the subscription request at 510. IN an aspect, TFL/NELOS data can comprise location data related to a mobile device or other UE. TFL/NELOS data can be received, for example, from a TFL/NELOS component such as NELOS component 230 in FIG. 2, etc., from a UE directly, or via another component such as a data store, cloud environment device, etc. As such, TFL/NELOS data can indicate near real time location or location data, historical location or location data, cached location or location data, etc. The particulars of capturing, determining, or generating TFL, TFL information, or NELOS information is outside of the scope of the instant disclosure except where more particularly pointed out herein and to note that these types of location related information, e.g., TFL information, etc., are distinct from more conventional types of location related information, such as that from GPS, triangulation, trilateration, beacon ranging, etc. As such, the use of TFL, TFL information, NELOS information, NELOS technology, etc., in combination with the instant disclosure provides advantages over conventional technologies.

At 530, method 500 can include affiliating location data related to the location data system identifier with the subscriber identifier. In an aspect, location data in a TFL/NELOS system can be generally affiliated with an identifier determined by a network carrier entity, e.g., a primary identifier. At 530, the relationship between the subscriber identifier and the primary identifier can be exploited to affiliate the location data with the correct subscriber identifier, such that a subscriber can employ the subscriber identifier to access location data for a corresponding mobile device of object comprising the mobile device, e.g., a vehicle, cargo container, ship, package, animal collar, wearable device, etc. The affiliated location data can be made available to the subscriber based on the subscriber identity, e.g., via SDD 142, etc.

At 540, access to a subscriber data deliverable, e.g., SDD 142, etc., can be facilitated in response to the affiliating the location data with the subscriber identifier. At this point, method 500 can end. The subscriber data deliverable can comprise the location data. The location information can comprise a location, location data, TFL information, NELOS information, derivatives thereof, or other related information. In an embodiment, NELOS data can be made available, in response to receiving the subscription request at 510, without change. In other embodiments, NELOS data can be processed, analyzed, etc., such that the information made available, in response to the subscription request at 510, comprises information derived from NELOS data, e.g., the information made available can be different from the NELOS data.

Figure 6:
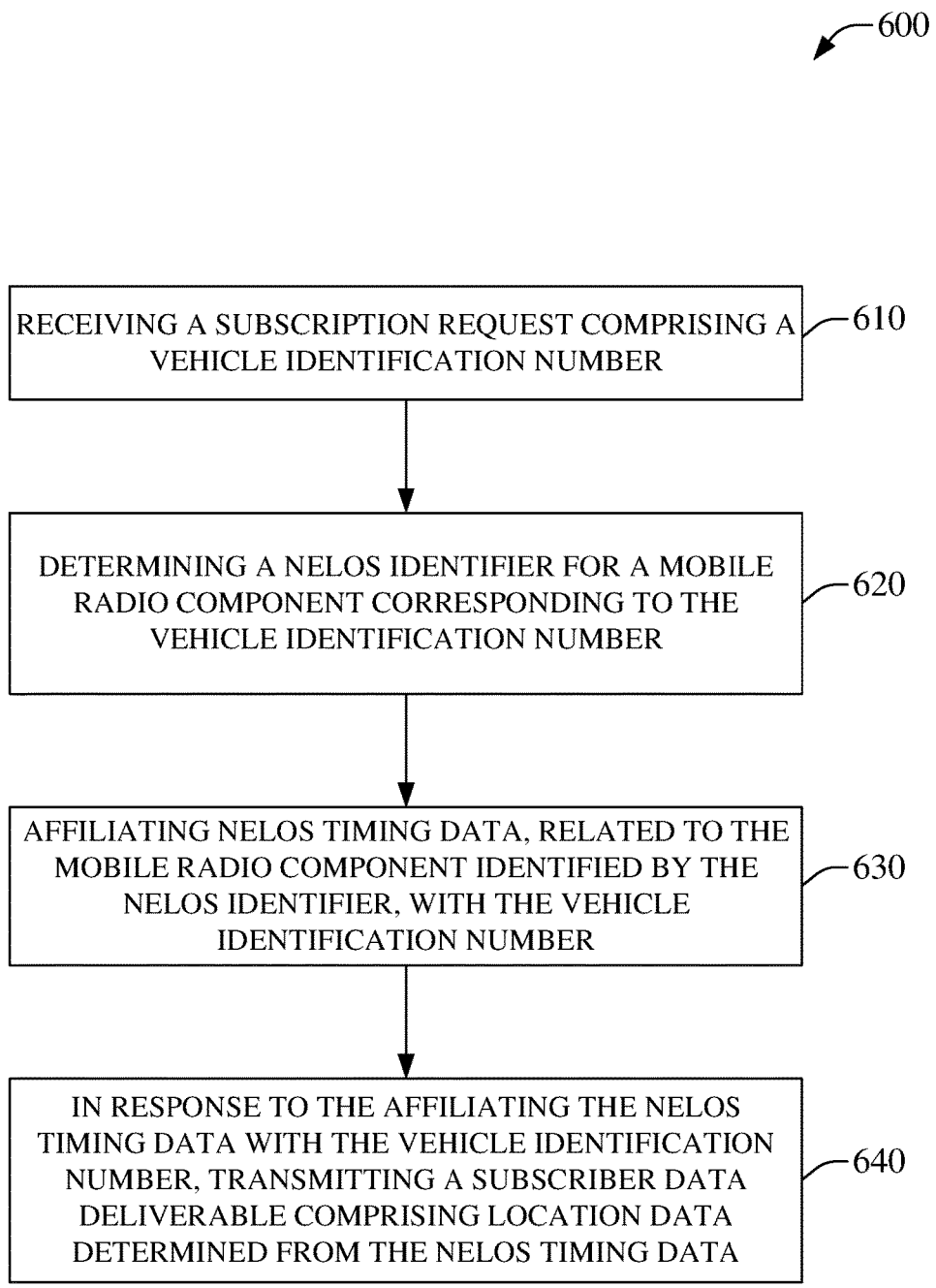
FIG. 6 illustrates an example method facilitating access to NELOS-type mobile device location information based on vehicle identification number in accordance with aspects of the subject disclosure.

FIG. 6 illustrates a method 600 facilitating access to mobile device location information based on vehicle identification number in accordance with aspects of the subject disclosure. At 610, method 600 can comprise receiving a subscription request. The subscription request can comprise a VIN. The VIN can be associated with a vehicle comprising a mobile radio component that can access a mobile carrier wireless network. In an aspect, the VIN can be correlated to a primary identifier, e.g., an identifier used by a mobile carrier entity to identify a mobile radio component accessing a mobile carrier wireless network. As an example, the primary identifier can be an IMEI, a serial number, etc. A subscription request can comprise a parameter related to location information to be made available.

At 620, method 600 can comprise determining a NELOS identifier for a mobile radio component corresponding to the VIN. The NELOS identifier can be a primary identifier and can correspond to, or be affiliated with, the subscriber identity. In an aspect, the NELOS identifier can be used to access TFL/NELOS information corresponding to the mobile radio component. In an aspect, TFL/NELOS data can comprise location data related to a mobile device or other UE comprising the mobile radio component. TFL/NELOS data can indicate near real time location or location data, historical location or location data, cached location or location data, etc.

At 630, method 600 can include affiliating the NELOS timing data with the VIN, wherein the NELOS timing data is related to the mobile radio component identified by the NELOS identifier. In an aspect, location data in a TFL/NELOS system can be generally affiliated with an identifier determined by a network carrier entity, e.g., a primary identifier that can be the same or different from the NELOS identifier. The relationship between the subscriber identifier and the NELOS identifier can indicate an affiliation between the NELOS timing data and the subscriber identifier. The affiliated NELOS timing data can be made available to the subscriber via an SDD, e.g., SDD 142, etc.

At 640, a subscriber data deliverable, e.g., SDD 142, etc., can be transmitted in response to the affiliating the NELOS timing data with the VIN. At this point, method 600 can end. The subscriber data deliverable can comprise the NELOS timing data. The location information can comprise a location, location data, TFL information, NELOS information, derivatives thereof, or other related information. In an embodiment, NELOS data can be made available, in response to receiving the subscription request at 610, without change. In other embodiments, NELOS data can be processed, analyzed, etc., such that the information made available, in response to the subscription request at 610, comprises information derived from NELOS data, e.g., the information made available can be different from the NELOS data.

Figure 7:
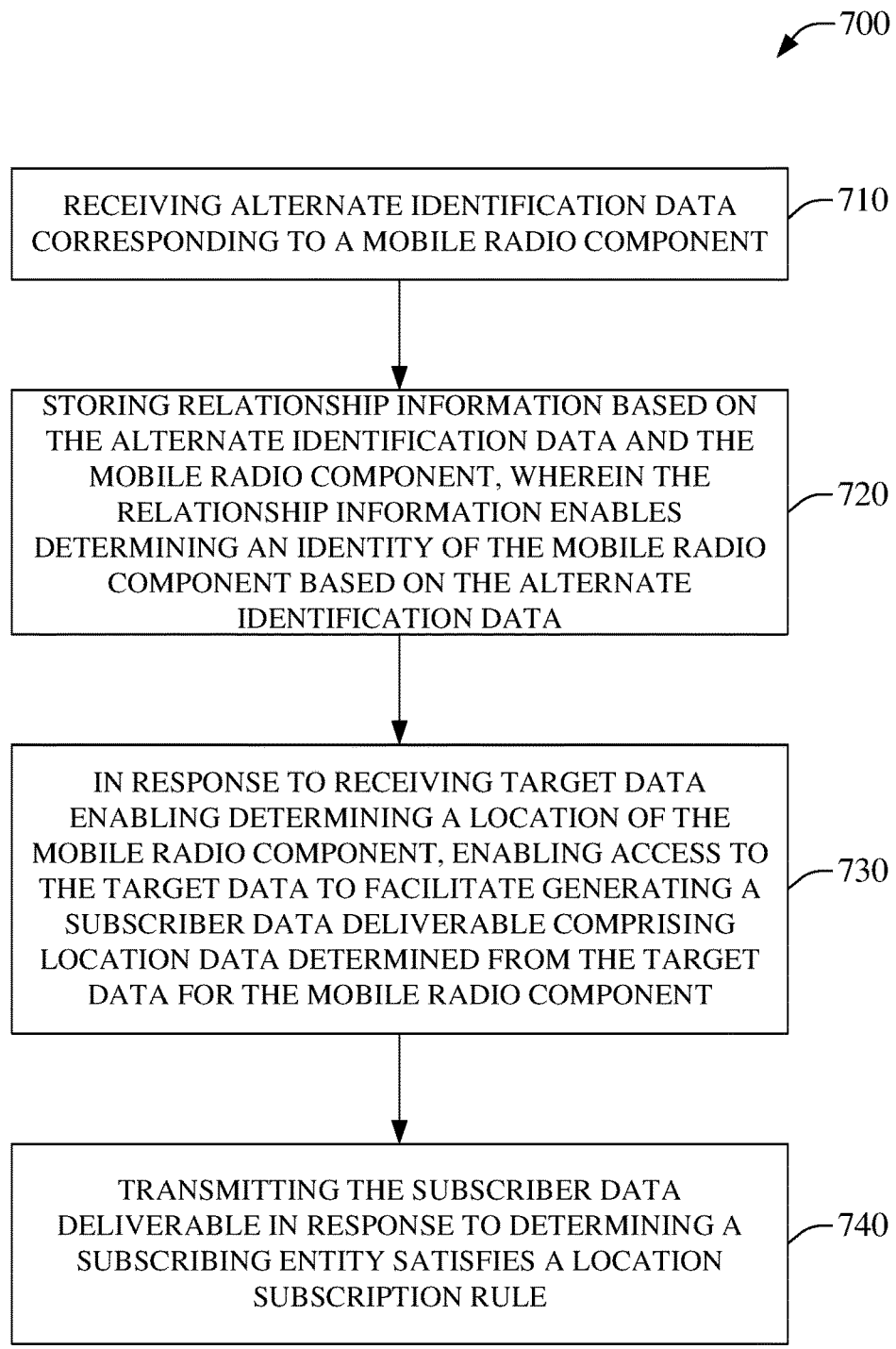
FIG. 7 depicts an example method enabling transmission of mobile device location information based on a stored relationship between an alternate identifier and a mobile radio identifier in accordance with aspects of the subject disclosure.

FIG. 7 illustrates a method 700 that facilitates access to NELOS-type mobile device location information based on vehicle identification number in accordance with aspects of the subject disclosure. At 710, method 700 can include can include receiving alternate identification data corresponding to a mobile radio component. The alternate identification data can comprise, for example a VIN, a fleet vehicle identifier, a cargo container identifier, etc. In an aspect, the alternate identification data can be correlated to a primary identifier, e.g., an identifier used by a mobile carrier entity to identify a mobile radio component or device comprising a mobile radio component that can access a mobile carrier wireless network. As an example, the primary identifier can be an IMEI, a serial number, etc.

At 720, relationship information can be stored. The relationship information can be based on the alternate identification data and the mobile radio component. The relationship information can enable determining an identity, e.g., the primary identity, etc., of the mobile radio component based on the alternate identification data. The relationship information can be stored, for example, on LDSC 110, 210, 310, 410, etc., on vehicle chain storage device 450, government storage device 460, subscriber storage device 470, etc.

At 730, method 700 can comprise, enabling access to received target data. The target data can facilitate generating a subscriber data deliverable that can comprise location data determined from the target data for the mobile radio component. In an aspect the subscriber data deliverable can comprise location data. The location data can be determined from the target data, e.g., the location data for the mobile radio component. The target data can be received by system 700 from a device comprising the mobile radio component and can be identified, e.g., via a primary identifier, as being associated with the mobile radio component. In response to the target data is received, the alternate identification data can be used to determine the corresponding target data based on the relationship between the alternate identification data and the mobile radio component.

At 740, the subscriber data deliverable can be transmitted in response to determining a subscribing entity satisfies a location subscription rule. At this point, method 700 can end. The location subscription rule can enable control of data capture, data analysis, and subscription management, for a mobile radio component. As an example, a plurality of mobile devices for which location related information is desired can be designated in a subscription request and the mobile devices can be identified with the alternate identification data. Rules can be applied that can apply to all, some, one, or none of a plurality of mobile radio components, e.g., a first rule can request that location information for all devices be provided at least hourly, a second rule can request that location information within a determined distance of a locus be provided as soon as possible, and a third rule can request that mobile device identities associated with a user age value of less than 18 years be withheld, etc. Depending on how the first, second, third rule, etc., are organized, these rules can result in access to different data packages for the third party subscriber according to the goals of the third party subscriber.

Figure 8:
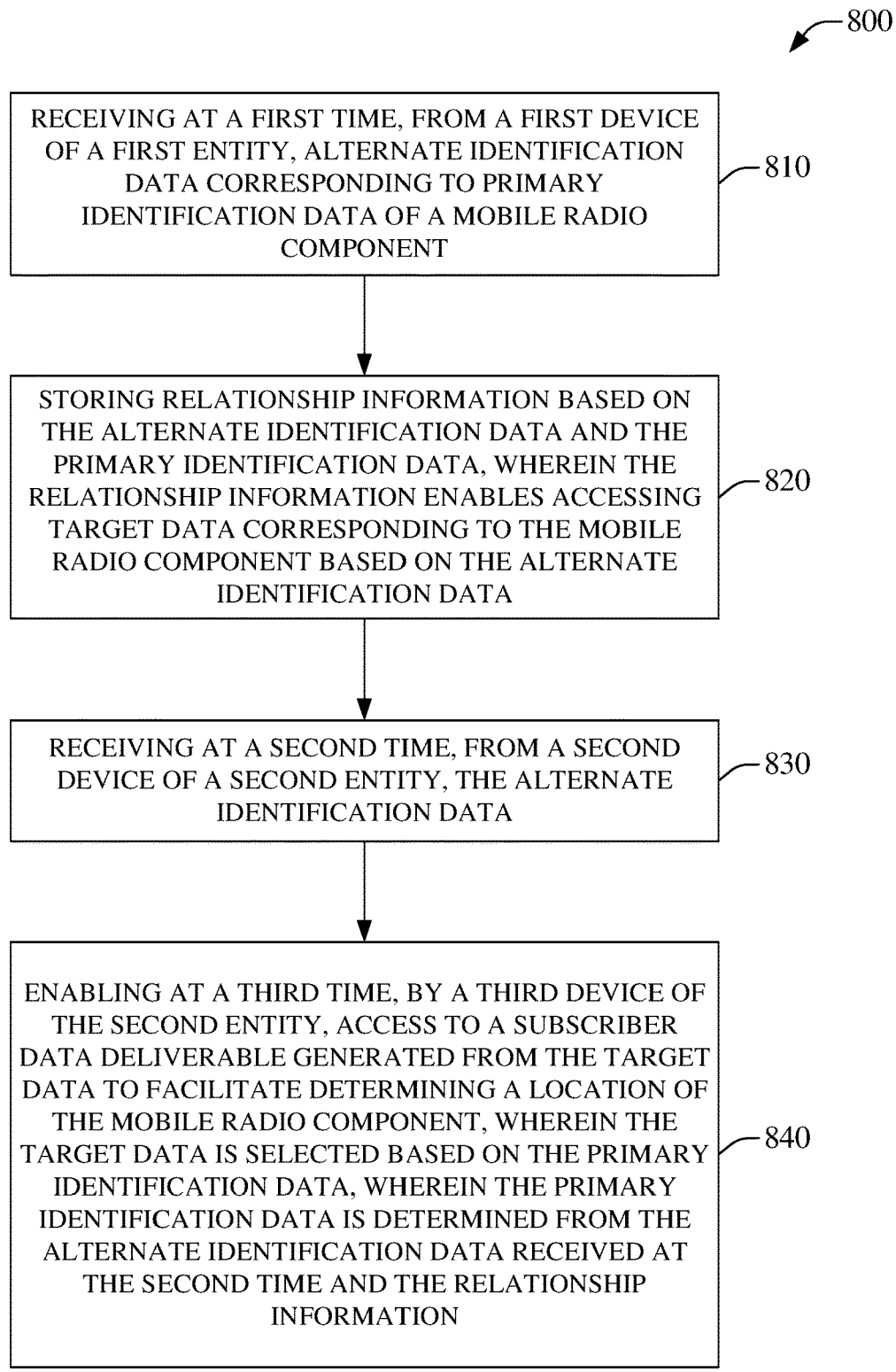
FIG. 8 illustrates an example method facilitating access to mobile device location information based on an alternate identifier that is designated prior to querying for a location of a mobile device in accordance with aspects of the subject disclosure.

FIG. 8 illustrates a method 800 that facilitates access to mobile device location information based on an alternate identifier that is designated prior to querying for a location of a mobile device in accordance with aspects of the subject disclosure. At 810, method 800 can include can include receiving, at a first time, alternate identification data. The alternate identification data can be received form a first device of a first entity. The alternate identification data can correspond to primary identification data of a mobile radio component. The alternate identification data can be, for example, a VIN, serial number, fleet vehicle number, etc. The primary identification data can be, for example, an IMSI, phone number, serial number, etc.

At 820, relationship data can be stored. The relationship data can be based on the alternate identification data and the primary identification data. The relationship data can enable accessing target data corresponding to the mobile radio component based on the alternative identification data. This relationship data can be stored, after the first time for later use. In an aspect, the relationship data can comprise one or more relationships between one or more alternative identities and one or more primary identities.

At 830, at a second time, the alterative identification data can be received from a second device. The alterative identification data received from the second device at the second time can be associated with a location query. The location query can identify, e.g., via the alterative identification data, devices for which location data is desired. However, the alterative identification data can be different from the primary identification data employed by a location subscription system, e.g., LDSC 110, 210, 310, 410, etc. Accordingly, the relationship data stored at 820 can be employed to determine which primary identification data corresponds to the alternative identification data received at the second time from the second device.

At 840, access to a subscriber data deliverable is enabled at a third time by a third device. At this point method 800 can end. The subscriber data deliverable is generated from the target data to facilitate determining a location of the mobile radio component. The target data is selected based on the primary identification data. The primary identification data is determined from the alternative identification data received at the second time and the relationship information stored at 820.

In an aspect, method 800 illustrates that relationship data can be determined between primary identification data and alternative identification data at a first time. At a second time, e.g., a later time, the alternative identification data can be again received from a second device, e.g., a subscriber device, etc. This second instance of the alterative identification data can be used with the relationship data to determine the corresponding primary identification data to enable access to relevant location data. At a third time the relevant location data can be returned to a third device via a subscriber data deliverable. As an example, a car manufacturer can associate a VIN with a mobile radio component of a manufactured vehicle, which information can be stored. Later, for example when a subscription request is received comprising the VIN, the VIN can be used to determine the primary identity of the mobile radio component of the car from the stored relationship data. The relevant location for the example vehicle, e.g., for the mobile radio component of the vehicle, can then be returned at another time, e.g., a third time, to a third device via a subscription data deliverable. In some embodiments, the second and third device can be the same device. In other embodiments, the second and third device can be different devices. In some embodiments the second and third time can be near in time, e.g., the SDD can be returned relatively soon after the subscription request is received, etc. In other embodiments, the second and third time may not be close in time, e.g., the SDD can be returned after a longer period of time, such as in instances where the location data can be processed, aggregated, triggered by an event, geo-fencing, etc., or other causes of temporal delay.

Figure 9:
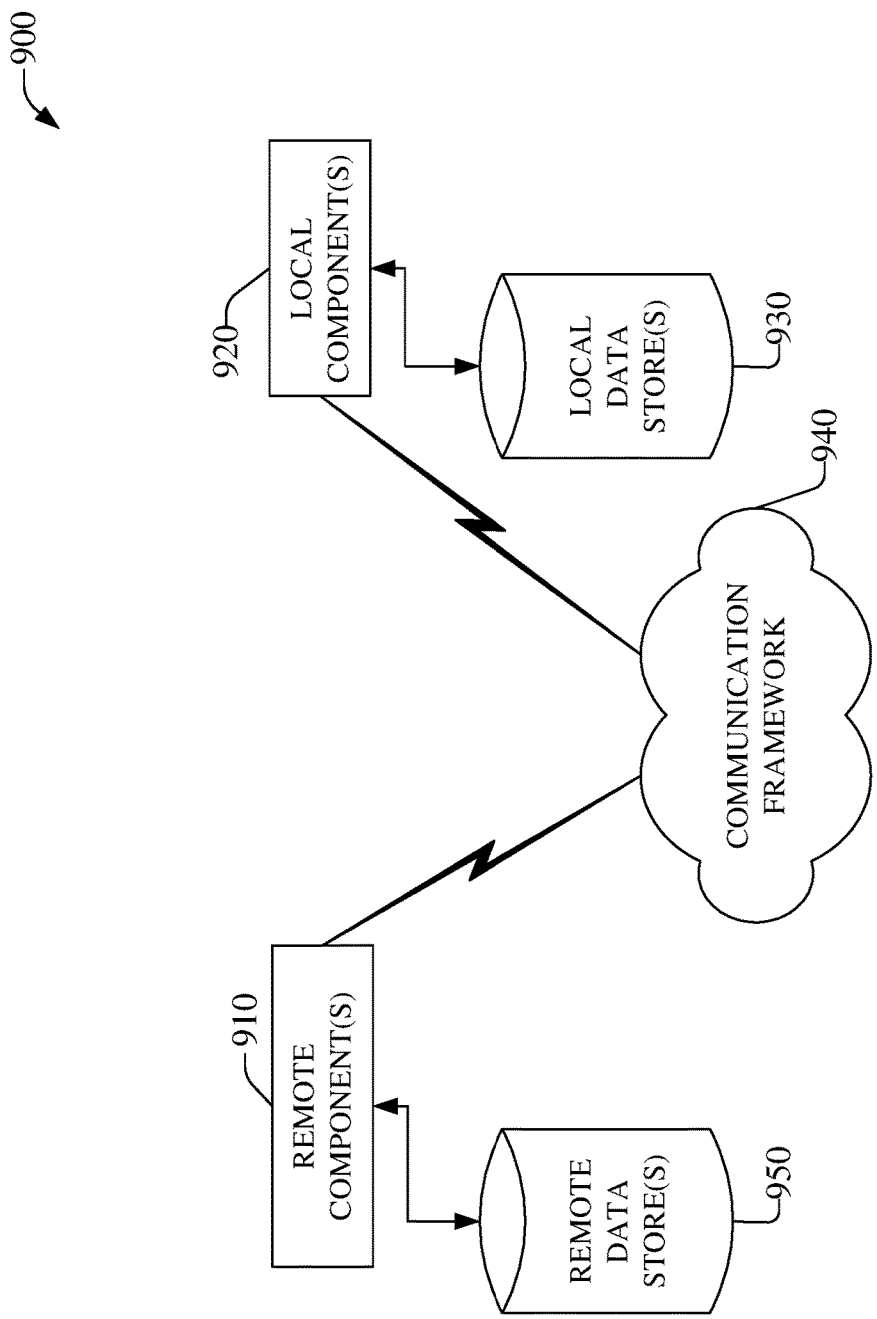
FIG. 9 depicts an example schematic block diagram of a computing environment with which the disclosed subject matter can interact, or in which aspects can be implemented.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be a mobile radio component 250, 350, etc., third party component 220, etc., NELOS component 230, 330, 430, etc., vehicle chain storage device 450, government storage device 460, subscriber storage device 470, subscriber input device(s) 440, etc.

The system 900 also includes one or more local component(s) 920. The local component(s) 920 can be hardware and/or software (e.g., threads, processes, computing devices). In some embodiments, local component(s) 920 can include, for example, LDSC 110, 210, 310, 410, etc., NELOS component 230, 330, 430, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a hard drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
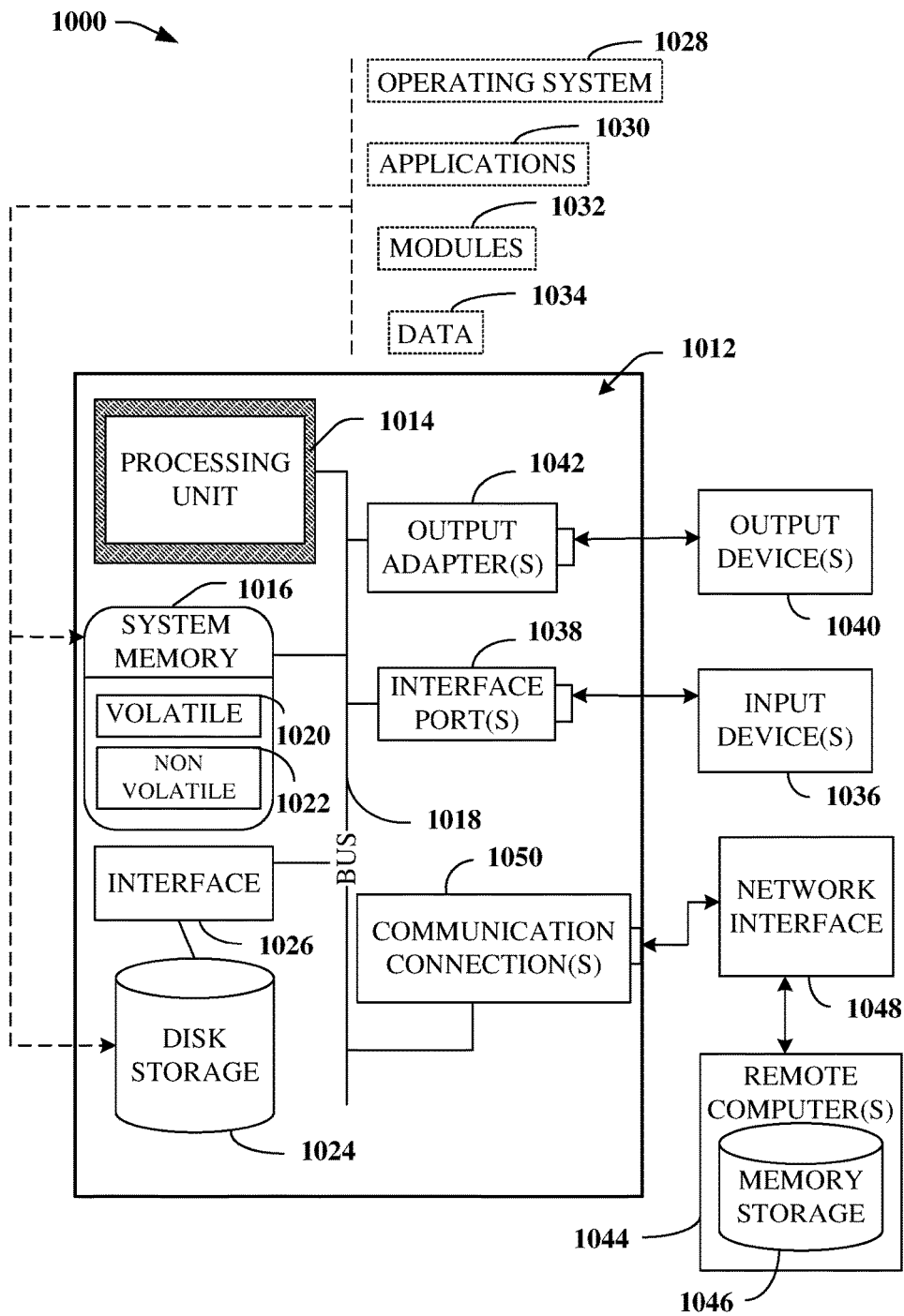
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of LDSC 110, 210, 310, 410, etc., NELOS component 230, 330, 430, etc., mobile radio component 250, 350, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving a subscription request from a third party component, wherein the request is related to facilitating access to location data by the system, e.g., LDSC 110, 210, 310, 410, etc., and in response to the receiving the subscription request, receiving NELOS data by the system, and pushing the location data to the third party component, without an additional request by the third party component.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036, e.g., subscriber input device(s) 440, etc. As an example, a user interface can allow entry of aspects of a subscription request via third party component 220, etc., and can be embodied in a touch sensitive display panel, a mouse input GUI, a command line controlled interface, etc., allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, vehicle subsystems, such as headlights, brake lights, stereos, vehicle information sharing device, etc., can include an output adapter 1042 to enable use in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, can refer to a wireless device utilized by a wireless services subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
   a processor; and
   a memory that stores executable instructions that, when executed by the processor, facilitate performance of operations, comprising:
   receiving a request for mobile device location information, wherein the request indicates an alternative identity, and wherein the alternative identity identifies a vehicle;
   determining a primary identity for a mobile device corresponding to the alternative identity, wherein the determining is based on a previously designated relationship between the alternative identity and the primary identity; and
   in response to receiving location information related to a location of the mobile device associated with the primary identity, facilitating access to location data related to the location information based on a parameter of the request satisfying a rule related to a permission to access the location data.

2. The system of claim 1, wherein the facilitating the access to the location data comprises pushing the location data to the subscribing device without a further request from the subscribing device.

3. The system of claim 1, wherein the facilitating the access to the location data comprises publishing the location data to facilitate a polling of the location data, based on the alternative identity, by the subscribing device without receiving a further request from the subscribing device.

4. The system of claim 1, wherein the facilitating the access to the location data is based on the alternative identity and comprises receiving a subsequent request from the subscribing device to access the location data.

5. The system of claim 1, wherein the parameter of the request comprises an indicator of a continuing access to the location data by the subscribing device, and wherein the continuing access is allowed until a condition related to the continuing access is satisfied.

6. The system of claim 1, wherein the alternative identity is a vehicle identification number identifier.

7. The system of claim 1, wherein the alternative identity is a license plate identifier.

8. The system of claim 1, wherein the alternative identity is a fleet vehicle identification identifier.

9. A method, comprising:
   receiving, by a device comprising a processor, a subscription request from a subscribing device, wherein the subscription request comprises a subscriber designated identifier that identifies a vehicle;
   determining, by the device, a primary identifier of a user equipment based on a previously defined relationship between the primary identifier and the subscriber designated identifier, wherein the previously defined relationship is based on a historical subscriber input;
   receiving, by the device, location information related to a location of the user equipment associated with the primary identifier; and
   enabling, by the device, access to a data deliverable by the subscribing device, wherein the data deliverable comprises information related to the location information based on the subscription request.

10. The method of claim 9, wherein the enabling the access to the data deliverable comprises accessing the data deliverable via a push of information to the subscribing device without an additional request from the subscribing device.

11. The method of claim 9, wherein the enabling the access to the data deliverable comprises publishing the data deliverable to facilitate a polling of the data deliverable, based on the subscriber designated identifier, by the subscribing device without an additional request from the subscribing device.

12. The method of claim 9, wherein the determining the primary identifier of the user equipment is based on the previously defined relationship between the primary identifier and a vehicle identification number.

13. The method of claim 9, wherein the determining the primary identifier of the user equipment is based on the previously defined relationship between the primary identifier and a license plate number.

14. The method of claim 9, wherein the determining the primary identifier of the user equipment is based on the previously defined relationship between the primary identifier and a fleet vehicle identification number.

15. A machine-readable storage device comprising executable instructions that, in response to execution, cause a device comprising a processor to perform operations, comprising:

receiving a request for mobile device location information from a subscribing device associated with a subscriber designated identity identifying a vehicle;

receiving network event locating system information related to a location of a mobile device affiliated with a primary identity;

in response to determining the primary identity based on the subscriber designated identity, wherein the determining the primary identity is based on previously received subscriber provided relationship information indicating a relationship between the subscriber designated identity and the primary identity, generating location data based on analysis of the network event locating system information; and sharing the location data with the subscribing device.

16. The machine-readable storage device of claim 15, wherein the sharing the location data comprises pushing the location data to the subscribing device without requiring a further request from the subscribing device.

17. The machine-readable storage device of claim 15, wherein the sharing the location data comprises publishing the location data to facilitate a polling of the location data, based on the subscriber designated identity, by the subscribing device without receiving a further request from the subscribing device.

18. The machine-readable storage device of claim 15, wherein the sharing the location data is based on the subscriber designated identity and comprises receiving a subsequent request from the subscribing device to access the location data.

19. The machine-readable storage device of claim 15, wherein the request comprises an indicator of a continuing access to the location data by the subscribing device, and wherein the continuing access is allowed until a condition related to the continuing access is satisfied.

20. The machine-readable storage device of claim 15, wherein the subscriber designated identity is selected from a group comprising a vehicle identification number, a license plate identifier, and a fleet vehicle identifier.

* * * * *